United States Patent
Hattori

(10) Patent No.: US 8,428,429 B2
(45) Date of Patent: Apr. 23, 2013

(54) INFORMATION PROCESSING APPARATUS, INFORMATION PROCESSING METHOD, REPRODUCING APPARATUS, REPRODUCING METHOD, PROGRAM, AND RECORDING MEDIUM

(75) Inventor: Shinobu Hattori, Tokyo (JP)

(73) Assignee: Sony Corporation, Tokyo (JP)

( * ) Notice: Subject to any disclaimer, the term of this patent is extended or adjusted under 35 U.S.C. 154(b) by 496 days.

(21) Appl. No.: 12/729,739

(22) Filed: Mar. 23, 2010

(65) Prior Publication Data

US 2010/0260485 A1   Oct. 14, 2010

(30) Foreign Application Priority Data

Apr. 8, 2009   (JP) .................................. 2009-093624

(51) Int. Cl.
*H04N 9/80* (2006.01)

(52) U.S. Cl.
USPC .......................................... 386/239; 382/154

(58) Field of Classification Search .................. 386/212, 386/239, 241, 244, 248; 348/42, 43, 47, 348/48, 136, 187; 382/154, 293
See application file for complete search history.

(56) References Cited

U.S. PATENT DOCUMENTS

| 8,111,758 B2 * | 2/2012 | Yun et al. ................. 375/240.28 |
| 2007/0047912 A1 | 3/2007 | Hattori et al. |
| 2010/0215343 A1 * | 8/2010 | Ikeda et al. ..................... 386/95 |

FOREIGN PATENT DOCUMENTS

JP   2007-95249   4/2007

OTHER PUBLICATIONS

U.S. Appl. No. 12/750,982, filed Mar. 31, 2010, Hattori.

* cited by examiner

*Primary Examiner* — Thai Tran
*Assistant Examiner* — Mishawn Dunn
(74) *Attorney, Agent, or Firm* — Oblon, Spivak, McClelland, Maier & Neustadt, L.L.P.

(57) ABSTRACT

An information processing apparatus includes a controller that sets type information, which represents that an application for executing a process using a dependent view video stream is an application for reproducing a 3-D image, in a clip information file which describes information on a transport stream including the dependent view video stream out of a base view video stream and the dependent view video stream obtained by encoding a plurality of video data according to the a predetermined video coding format.

14 Claims, 23 Drawing Sheets

FIG. 8

PlayList-Syntax

| Syntax | No. of bits | Mnemonic |
|---|---|---|
| PlayList() { | | |
|   length | 32 | uimsbf |
|   reserved_for_future_use | 16 | bslbf |
|   number_of_PlayItems | 16 | uimsbf |
|   number_of_SubPaths | 16 | uimsbf |
|   for (PlayItem_id=0; | | |
|     PlayItem_id<number_of_PlayItems; | | |
|     PlayItem_id++) { | | |
|       PlayItem() | | |
|   } | | |
|   for (SubPath_id= 0; | | |
|     SubPath_id<number_of_SubPaths; | | |
|     SubPath_id++) { | | |
|       SubPath() | | |
|   } | | |
| } | | |

FIG. 9

SubPath-Syntax

| Syntax | No. of bits | Mnemonic |
|---|---|---|
| SubPath() { | | |
|   length | 32 | uimsbf |
|   reserved_for_future_use | 8 | bslbf |
|   SubPath_type | 8 | uimsbf |
|   reserved_for_future_use | 15 | uimsbf |
|   is_repeat_SubPath | 1 | bslbf |
|   reserved_for_future_use | 8 | bslbf |
|   number_of_SubPlayItems | 8 | uimsbf |
|   for (i=0; i< number_of_SubPlayItems; i++) { | | |
|     SubPlayItem(i) | | |
|   } | | |
| } | | |

FIG. 10

| SubPath_type | |
|---|---|
| SubPath | Meaning |
| 0 | reserved |
| 1 | reserved |
| 2 | Out-of-mux and Audio presentation path of the Browsable slideshow (The audio presentation path using the SubPath is not synchronized with the main path using PlayItems in the PlayList.) |
| 3 | Out-of-mux and Interactive graphics presentation menu (The interactive graphics menu using the SubPath is not synchronized with the main path using PlayItems in the PlayList.) |
| 4 | Out-of-mux and Text subtitle presentation path (The text subtitle presentation path using the SubPath is synchronized with the main path using PlayItems in the PlayList.) |
| 5 | Out-of-mux and 2nd Audio Presentation path (The 2nd Audio Presentation path using the SubPath is synchronized with the main path using PlayItems in the PlayList.) |
| 6 | Out-of-mux and 2nd Video Presentation path (The 2nd Video Presentation path using the SubPath is synchronized with the main path using PlayItems in the PlayList.) |
| 7 | Out-of-mux and AV synchronized type of one or more elementary streams path (Primary audio/PG/IG/Secondary audio path.) Out-of-mux and AV synchronized type of Picture-in-Picture presentation path which contains one or more elementary stream paths. (The elementary streams used by the path are multiplexed in a separate Clip from other Clip used by PlayItem. The path using the SubPath is synchronized with the main path using PlayItems in the PlayList.) |
| 8 | Out-of mux MPEG-4 MVC Dependent video stream for 3D application path from Disc (The elementary stream used by the path are multiplexed in a separate Clip from Clip used by the associated PlayItem. The path using the SubPath is synchronized with the main path using PlayItems in the PlayList) |
| 9 | In-mux MPEG-4 MVC Dependent video stream for 3D application path from Disc (The elementary streams used by the path are multiplexed in the same Clip used by the associate PlayItem. The path using the SubPath is synchronized with the main path using PlayItems in the PlayList.) |
| 10 | Out-of mux MPEG-4 MVC Dependent video stream for 3D application path from Local Storage (The elementary stream used by the path are multiplexed in a separate Clip from Clip used by the associated PlayItem. The path using the SubPath is synchronized with the main path using PlayItems in the PlayList) |
| 11 | In-mux MPEG-4 MVC Dependent video stream for 3D application path from Local Storage (The elementary streams used by the path are multiplexed in the same Clip used by the associate PlayItem. The path using the SubPath is synchronized with the main path using PlayItems in the PlayList.) |
| 12-255 | reserved |

FIG. 11

SubPlayItem(i)-Syntax

| Syntax | No. of bits | Mnemonic |
|---|---|---|
| SubPlayItem(i) { | | |
|   length | 16 | uimsbf |
|   Clip_Information_file_name[0]    //subclip_entry_id=0 | 8*5 | bslbf |
|   Clip_codec_identifier[0] | 8*4 | bslbf |
|   reserved_for_future_use | 31 | bslbf |
|   is_multi_Clip_entries | 1 | bslbf |
|   ref_to_STC_id[0] | 8 | uimsbf |
|   SubPlayItem_IN_time | 32 | uimsbf |
|   SubPlayItem_OUT_time | 32 | uimsbf |
|   sync_PlayItem_id | 16 | uimsbf |
|   sync_start_PTS_of_PlayItem | 32 | uimsbf |
|   if(is_multi_Clip_entries==1b) { | | |
|     reserved_for_future_use | 8 | bslbf |
|     num_of_Clip_entries | 8 | uimsbf |
|     for (subclip_entry_id=1;//Note:Entries after subclip_entry_id=0 | | |
|     subclip_entry_id<num_of_Clip_entries;subclip_entry_id ++) { | | |
|       Clip_Information_file_name[subclip_entry_id] | 8*5 | bslbf |
|       Clip_codec_identifier[subclip_entry_id] | 8*4 | bslbf |
|       ref_to_STC_id[subclip_entry_id] | 8 | uimsbf |
|       reserved_for_future_use | 8 | bslbf |
|     } | | |
|   } | | |
| } | | |

FIG. 12

PlayItem-Syntax

| Syntax | No. of bits | Mnemonic |
|---|---|---|
| PlayItem() { | | |
|     length | 16 | uimsbf |
|     Clip_Information_file_name[0] | 8*5 | bslbf |
|     Clip_codec_identifier[0] | 8*4 | bslbf |
|     reserved_for_future_use | 11 | bslbf |
|     is_multi_angle | 1 | bslbf |
|     connection_condition | 4 | uimsbf |
|     ref_to_STC_id[0] | 8 | uimsbf |
|     IN_time | 32 | uimsbf |
|     OUT_time | 32 | uimsbf |
|     UO_mask_table() | | |
|     PlayItem_random_access_mode | 8 | uimsbf |
|     still_mode | 8 | uimsbf |
|     if(still_mode==0x1) { | | |
|         still_time | 16 | uimsbf |
|     }else{ | | |
|         reserved | 16 | bslbf |
|     } | | |
|     if(is_multi_angle==1b) { | | |
|         number_of_angles | 8 | uimsbf |
|         reserved_for_future_use | 7 | bslbf |
|         is_seamless_angle_change | 1 | uimsbf |
|         for(angle_id = 1; //Note: angles after angle_id=1 | | |
|         angle_id<number_of_angles; angle_id++) { | | |
|             Clip_Information_file_name[angle_id] | 8*5 | bslbf |
|             Clip_codec_identifier[angle_id] | 8*4 | bslbf |
|             ref_to_STC_id[angle_id] | 8 | uimsbf |
|             reserved_for_future_use | 16 | bslbf |
|         } | | |
|     } | | |
|     STN_table() | | |
| } | | |

FIG. 13

| STN_table() | | |
|---|---|---|
| Syntax | No. of bits | Mnemonic |
| STN_table() { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_audio_stream2_entries | 8 | uimsbf |
|     number_of_PG_textST_stream_entries | 8 | uimsbf |
|     number_of_IG_stream_entries | 8 | uimsbf |
|     reserved_for_future_use | 64 | bslbf |
|     for (video_stream_id=0;<br>        video_stream_id < number_of_video_stream_entries;<br>        video_stream_id++) { | | |
|         stream_entry() | | |
|         stream_attribute() | | |
|     } | | |
|     for (audio_stream_id=0;<br>        audio_stream_id < number_of_audio_stream_entries;<br>        audio_stream_id++) { | | |
|         stream_entry() | | |
|         stream_attributes() | | |
|     } | | |
|     for (audio_stream_id2=0;<br>        audio_stream_id2 < number_of_audio_stream2_entries;<br>        audio_stream_id2++) { | | |
|         stream_entry() | | |
|         stream_attributes() | | |
|     } | | |
|     for (PG_textST_stream_id=0;<br>        PG_textST_stream_id < number_of_PG_textST_stream_entries;<br>        PG_textST_stream_id++) { | | |
|         stream_entry() | | |
|         stream_attribute() | | |
|     } | | |
|     for (IG_stream_id=0;<br>        IG_stream_id < number_of_IG_stream_entries;<br>        IG_stream_id++) { | | |
|         stream_entry() | | |
|         stream_attribute() | | |
|     } | | |
| } | | |

FIG. 14

| application_type | meaning | Stream Input |
|---|---|---|
| 0 | reserved | |
| 1 | TS for Movie applications | These type of Clip AV stream files may be provided from either Disc or Local storage |
| 2 | TS for Time based slide show | |
| 3 | TS for a main-path of Browsable slide show | |
| 4 | TS for a sub-path of Browsable slide show | |
| 5 | TS for a sub-path of Interactive graphics menu | |
| 6 | TS for a sub-path of Text subtitle | |
| 7 | TS for a sub-path of one or more elementary streams path | This type of Clip AV stream file may be provided only from Local storage, shall not provided from Disc |
| 8 | TS for a sub-path of 3D application | The TS shall contain only the Dependent view video stream at one time, and shall not contain other elementary streams |
| 9-255 | reserved | |

FIG. 19

| Syntax | No. of bits | Mnemonic |
| --- | --- | --- |
| xxxxx.mpls{ | | |
|     type_indicator | 8*4 | bslbf |
|     version_number | 8*4 | bslbf |
|     PlayList_start_address | 32 | uimsbf |
|     PlayListMark_start_address | 32 | uimsbf |
|     ExtensionData_start_address | 32 | uimsbf |
|     reserved_for_future_use | 160 | bslbf |
|     AppInfoPlayList() | | |
|     for(i=0; i<N1; i++) { | | |
|         padding_word | 16 | bslbf |
|     } | | |
|     PlayList() | | |
|     for(i=0; i<N2; i++) { | | |
|         padding_word | 16 | bslbf |
|     } | | |
|     PlayListMark() | | |
|     for(i=0; i<N3; i++) { | | |
|         padding_word | 16 | bslbf |
|     } | | |
|     ExtensionData() | | |
|     for(i=0; i<N4; i++) { | | |
|         padding_word | 16 | bslbf |
|     } | | |
| } | | |

FIG. 20

| xxxxx.mpls { | | |
|---|---|---|
| ... snip ... | | |
| 3D_PL_type | 2 | |
| if(3D_PL_type==01b||3D_PL_type==10) { | | |
| view_type | 1 | |
| reserved_for_future_use | 157 | |
| }else{ | | |
| reserved_for_future_use | 158 | |
| } | | |
| ... snip ... | | |
| } | | |

FIG. 21

| 3D_PL_type | MEANING |
|---|---|
| 00 | 2D PlayList |
| 01 | 3D B-D1 PlayList |
| 10 | 3D B-D2 PlayList |

FIG. 22

| view_type (is_L_Base_view_flag) | MEANING |
|---|---|
| 0 | L view or 2D AVC video stream |
| 1 | R view |

INFORMATION PROCESSING APPARATUS, INFORMATION PROCESSING METHOD, REPRODUCING APPARATUS, REPRODUCING METHOD, PROGRAM, AND RECORDING MEDIUM

BACKGROUND OF THE INVENTION

1. Field of the Invention

The present invention relates to an information processing apparatus, an information processing method, a reproducing apparatus, a reproducing method, a program, and a recording medium. Particularly, the present invention relates to an information processing apparatus, an information processing method, a reproducing apparatus, a reproducing method, a program, and a recording medium capable of setting information used to manage reproduction of a base view video stream and a dependent view video stream that is recorded on a recording medium such as a BD (blu-ray disk) and encoded according to the H.264 AVC/MVC.

2. Description of the Related Art 2-dimensional image contents such as movie contents are most widely used in the film industry or the like. Recently, stereoscopic image contents capable of providing a solid vision are being focused.

A dedicated device is demanded to display the solid image. As an example of the solid-vision device, an integral photography (IP) solid image system has been developed by the Japan Broadcasting Corporation (NHK).

Since the image data of the solid vision includes image data at a plurality of viewpoints (image data on images captured at a plurality of viewpoints), the number of viewpoints is large. Since the viewpoints are distributed in a wide range, an object can be seen from many directions. In other words, it is possible to implement a "peeping television".

A stereoscopic image (so-called 3-Dimensional image) has two viewpoints, which is the smallest number of viewpoints out of the solid-vision images. The image data of the stereoscopic image contains data on a left image observed by a left eye and data on a right image observed by a right eye.

Meanwhile, since high-resolution image contents such as a movie have a large data amount, a large-capacity recording medium is demanded in order to record the contents of a large data amount.

A Blu-Ray® disc (hereinafter, also referred to as a BD) such as a Blue-Ray®-ROM (Read Only Memory) is usually used as the high-capacity recording medium.

Japanese Unexamined Patent Application Publication No. 2007-095249 is an example of the related art.

However, the BD standard does not specify how to record or reproduce the solid-vision image data including stereoscopic image to/from the BD.

Even when management information of the image data used in the BD standard of the related art is employed without change, it may fail to reproduce the stereoscopic image data.

It is desirable to set the information used in management of reproducing base view video streams and dependent view video streams obtained by encoding the H.264 AVC/MVC video recorded on the recording medium such as a BD.

SUMMARY OF THE INVENTION

According to a first embodiment of the invention, an information processing apparatus includes a controller which sets type information, which represents that an application for executing a process using a dependent view video stream is an application for reproducing a 3-D image, in a clip information file which describes information on a transport stream including the dependent view video stream out of a base view video stream and the dependent view video stream obtained by encoding a plurality of video data according to a predetermined video coding format.

The controller may set the type information when the base view video stream and the dependent view video stream are included in different transport streams.

According to a first embodiment of the invention, an information processing method includes a step of setting type information, which represents that an application for executing a process using a dependent view video stream is an application for reproducing a 3-D image, in a clip information file which describes information on a transport stream including the dependent view video stream out of a base view video stream and the dependent view video stream obtained by encoding a plurality of video data according to a predetermined video coding format.

According to a first embodiment of the invention, a program executes, in a computer, a process including a step of setting type information, which represents that an application for executing a process using a dependent view video stream is an application for reproducing a 3-D image, in a clip information file which describes information on a transport stream including the dependent view video stream out of a base view video stream and the dependent view video stream obtained by encoding a plurality of video data according to a predetermined video coding format.

According to a first embodiment of the invention, there is provided a recording medium where type information, which represents that an application for executing a process using a dependent view video stream is an application for reproducing a 3-D image, is set in a clip information file which describes information on a transport stream including the dependent view video stream out of a base view video stream and a dependent view video stream obtained by encoding a plurality of video data according to a predetermined video coding format.

According to a second embodiment of the invention, a reproducing apparatus reproduces a base view video stream and a dependent view video stream by reading type information recorded in the recording medium where the type information, which represents that an application for executing a process using a dependent view video stream is an application for reproducing a 3-D image, is set in a clip information file which describes information on a transport stream including the dependent view video stream out of the base view video stream and the dependent view video stream obtained by encoding a plurality of video data according to a predetermined video coding format.

According to a second embodiment of the invention, a reproducing method includes a step of reproducing a base view video stream and a dependent view video stream by reading type information recorded in a recording medium where the type information, which represents that an application for executing a process using a dependent view video stream, is set in a clip information file which describes information on a transport stream including the dependent view video stream out of the base view video stream and the dependent view video stream obtained by encoding a plurality of video data according to a predetermined video coding format is an application for reproducing a 3-D image.

According to a second embodiment of the invention, a program executes, in a computer, a process including a step of reproducing a base view video stream and a dependent view video stream by reading type information recorded in a recording medium where the type information, which represents that an application for executing a process using a dependent view video stream, is set in a clip information file which describes information on a transport stream including the dependent view video stream out of the base view video stream and the dependent view video stream obtained by encoding a plurality of video data according to a predetermined video coding format is an application for reproducing a 3-D image.

According to a third embodiment of the invention, an information processing apparatus includes a controller that sets a different value as a value of type information which represents a type of a path which uses a dependent view video stream as a reproducing interval, included in reproduction management information used to manage reproduction of a base view video stream and the dependent view video stream obtained by encoding a plurality of video data according to a predetermined video coding format based on whether the dependent view video stream is multiplexed in the same transport stream as that of the base view video stream and a recording location of the dependent view video stream.

According to a third embodiment of the invention, an information processing method includes a step of setting a different value as a value of type information which represents a type of a path which uses a dependent view video stream as a reproducing interval, included in reproduction management information used to manage reproduction of a base view video stream and the dependent view video stream obtained by encoding a plurality of video data according to a predetermined video coding format based on whether the dependent view video stream is multiplexed in the same transport stream as that of the base view video stream and a recording location of the dependent view video stream.

According to a third embodiment of the invention, a program executes, in a computer, a process including a step of setting a different value as a value of type information which represents a type of a path which uses a dependent view video stream as a reproducing interval, included in reproduction management information used to manage reproduction of a base view video stream and the dependent view video stream obtained by encoding a plurality of video data according to a predetermined video coding format based on whether the dependent view video stream is multiplexed in the same transport stream as that of the base view video stream and a recording location of the dependent view video stream.

According to a third embodiment of the invention, there is provided a recording medium where a different value is set as a value of type information which represents a type of a path which uses a dependent view video stream as a reproducing interval, included in reproduction management information used to manage reproduction of a base view video stream and the dependent view video stream obtained by encoding a plurality of video data according to a predetermined video coding format based on whether the dependent view video stream is multiplexed in the same transport stream as that of the base view video stream and a recording location of the dependent view video stream.

According to a fourth embodiment of the invention, a reproducing apparatus reproduces a base view video stream and a dependent view video stream by reading type information recorded in the recording medium where a different value is set as a value of type information which represents a type of a path which uses a dependent view video stream as a reproducing interval, included in reproduction management information used to manage reproduction of a base view video stream and the dependent view video stream obtained by encoding a plurality of video data according to a predetermined video coding format based on whether the dependent view video stream is multiplexed in the same transport stream as that of the base view video stream and a recording location of the dependent view video stream.

According to a fourth embodiment of the invention, a reproducing method includes a step of reproducing a base view video stream and a dependent view video stream by reading type information recorded in a recording medium where a different value is set as a value of type information which represents a type of a path which uses a dependent view video stream as a reproducing interval, included in reproduction management information used to manage reproduction of a base view video stream and the dependent view video stream obtained by encoding a plurality of video data according to a predetermined video coding format based on whether the dependent view video stream is multiplexed in the same transport stream as that of the base view video stream and a recording location of the dependent view video stream.

According to a fourth embodiment of the invention, a program executes, in a computer, a process including a step of reproducing a base view video stream and a dependent view video stream by reading type information recorded in a recording medium where a different value is set as a value of type information which represents a type of a path which uses a dependent view video stream as a reproducing interval, included in reproduction management information used to manage reproduction of a base view video stream and the dependent view video stream obtained by encoding a plurality of video data according to a predetermined video coding format based on whether the dependent view video stream is multiplexed in the same transport stream as that of the base view video stream and a recording location of the dependent view video stream.

According to a first embodiment of the invention, type information, which represents that an application for executing a process using a dependent view video stream is an application for reproducing a 3-D image, is set in a clip information file which describes information on a transport stream including the dependent view video stream out of a base view video stream and the dependent view video stream obtained by encoding a plurality of video data according to a predetermined video coding format.

According to a second embodiment of the invention, a base view video stream and a dependent view video stream are reproduced by reading type information recorded in the recording medium where the type information, which represents that an application for executing a process using a dependent view video stream is an application for reproducing a 3-D image, is set in a clip information file which describes information on a transport stream including the dependent view video stream out of the base view video stream and the dependent view video stream obtained by encoding a plurality of video data according to a predetermined video coding format.

According to a third embodiment of the invention, a different value is set as a value of type information which represents a type of a path which uses a dependent view video stream as a reproducing interval, included in reproduction management information used to manage reproduction of a base view video stream and the dependent view video stream obtained by encoding a plurality of video data according to a predetermined video coding format based on whether the dependent view video stream is multiplexed in the same transport stream as that of the base view video stream and a recording location of the dependent view video stream.

According to a fourth embodiment of the invention, a base view video stream and a dependent view video stream are reproduced by reading type information recorded in a recording medium where a different value is set as a value of type information which represents a type of a path which uses a dependent view video stream as a reproducing interval, included in reproduction management information used to manage reproduction of a base view video stream and the dependent view video stream obtained by encoding a plurality of video data according to a predetermined video coding format based on whether the dependent view video stream is multiplexed in the same transport stream as that of the base view video stream and a recording location of the dependent view video stream.

According to the present invention, it is possible to set the information used in management of reproducing base view video streams and dependent view video streams obtained by encoding the H.264 AVC/MVC video recorded on the recording medium such as a BD.

BRIEF DESCRIPTION OF THE DRAWINGS

FIG. 8 illustrates syntax of a Playlist file.

FIG. 9 illustrates syntax of SubPath( ) of FIG. 8.

FIG. 10 illustrates an example of SubPath_type.

FIG. 11 illustrates syntax of SubPlayItem(i) of FIG. 9.

FIG. 12 illustrates syntax of PlayItem( ) of FIG. 8.

FIG. 13 illustrates syntax of STN_table( ) of FIG. 12.

FIG. 14 illustrates an example of application_type.

FIG. 19 illustrates syntax of a PlayList file.

FIG. 20 illustrates how to use reserved_for_future_use of FIG. 19.

FIG. 21 illustrates meaning of a value of 3D_PL_type.

FIG. 22 illustrates meaning of a value of view_type.

DESCRIPTION OF THE PREFERRED EMBODIMENTS

Configuration Example of Reproducing System

Figure 1:
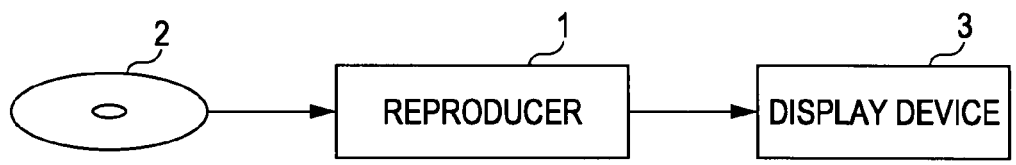
FIG. 1 illustrates a configuration example of a reproducing system including a reproducer according to an embodiment of the invention.

FIG. 1 illustrates a configuration example of a reproducing system including a reproducer 1 according to an embodiment of the invention.

Referring to FIG. 1, the reproducing system includes a reproducer 1 and a display device 3 connected with a HDMI (High Definition Multimedia Interface) cable or the like. The reproducer 1 is installed with an optical disc 2 such as a BD.

Streams are recorded on the optical disc 2 as much as necessary to display a stereoscopic image (a so-called 3-D image) having two viewpoints.

The reproducer 1 is a player corresponding to the 3-D reproducing of the streams recorded on the optical disc 2. The reproducer 1 reproduces the streams recorded on the optical disc 2 and displays 3-D images obtained by reproducing it on a display device 3 such as a television set. Similarly, the reproducer 1 reproduces an audio and outputs it to a loudspeaker installed in the display device 3.

Various schemes have been proposed as the 3-D image display scheme. Herein, type 1 and 2 display schemes are employed as the 3-D image display scheme.

In the type 1 display scheme, a 3-D image is displayed by constructing the 3-D image data of data on an image observed by a left eye (referred to as an L image) and data on an image observed by a right eye (referred to as an R image) and alternately displaying the L and R images.

In the type 2 display scheme, a 3-D image is displayed by displaying the L and R images generated by using original image data of the images functioning as a basis for generating the 3-D image and depth data. The data on the 3-D image used in the type 2 display scheme includes original image data and depth data capable of generating L and R images provided by the original image.

The type 1 display scheme demands a user to wear spectacles to watch the 3-D image. The type 2 display scheme allows a user to watch the 3-D image without spectacles.

On the optical disc 2, streams made to display the 3-D image using either of the type 1 or 2 display scheme are recorded.

As an encoding scheme for recording such streams on the optical disc 2, for example, a H.264 AVC (Advanced Video Coding)/MVC (Multi-view Video coding) is employed.

H.264 AVC/MVC Profile

According to the H.264 AVC/MVC, base view video streams and dependent view video streams are defined. Hereinafter, the H.264 AVC/MVC will be referred to as an MVC.

Figure 2:
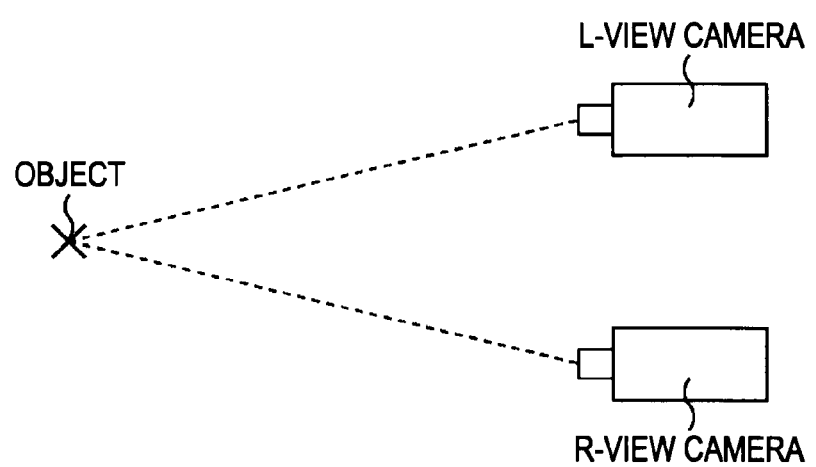
FIG. 2 illustrates an example of an image capture.

FIG. 2 illustrates an example of an image capture.

Referring to FIG. 2, the image capturing is performed using a camera for the L-view and a camera for the R-view with respect to the same target object. Elementary steams of the videos captured using the camera for the L-view and camera for the R-view are input to the MVC encoder.

Figure 3:
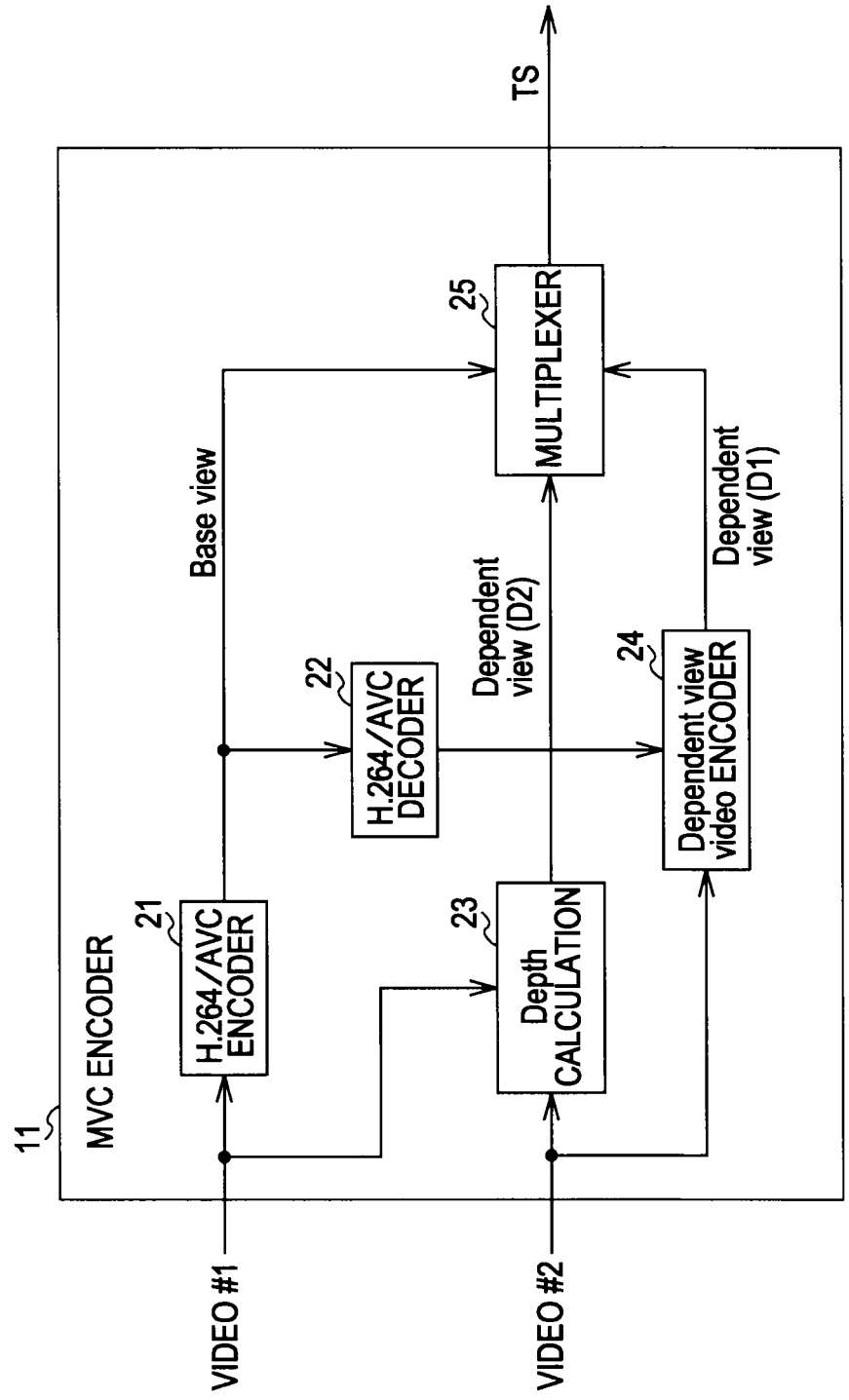
FIG. 3 is a block diagram illustrating a configuration example of a MVC encoder.

FIG. 3 is a block diagram illustrating a configuration example of an MVC encoder.

Referring to FIG. 3, the MVC encoder 11 includes an H.264/AVC encoder 21, an H.264/AVC decoder 22, a depth calculation unit 23, a dependent view video encoder 24, and a multiplexer 25.

The streams of a video #1 captured using the camera for the L-view are input to the H.264/AVC encoder 21 and the depth calculation unit 23. The streams of a video #2 captured using the camera for the R-view are input to the depth calculation unit 23 and the dependent view video encoder 24. Alternatively, the streams of the video #2 may be input to the H.264/AVC encoder 21 and the depth calculation unit 23, and the streams of the video #1 may be input to the depth calculation unit 23 and the dependent view video encoder 24.

The H.264/AVC encoder 21 encodes the stream of the video #1, for example, as a H.264 AVC high profile video stream. The H.264/AVC encoder 21 outputs the AVC video stream obtained through the encoding to the H.264/AVC decoder 22 and the multiplexer 25 as the base view video stream.

The H.264/AVC decoder 22 decodes the AVC video stream supplied from the H.264/AVC encoder 21 and outputs the stream of the video #1 obtained through the decoding to the dependent view video encoder 24.

The depth calculation unit 23 calculates a depth based on the streams of the video #1 and #2 and outputs the data on the calculated depth to the multiplexer 25.

The dependent view encoder 24 encodes the stream of the video #1 supplied from the H.264/AVC decoder 22 and the stream of the video #2 input from the outside and outputs a dependent view video stream.

Figure 4:
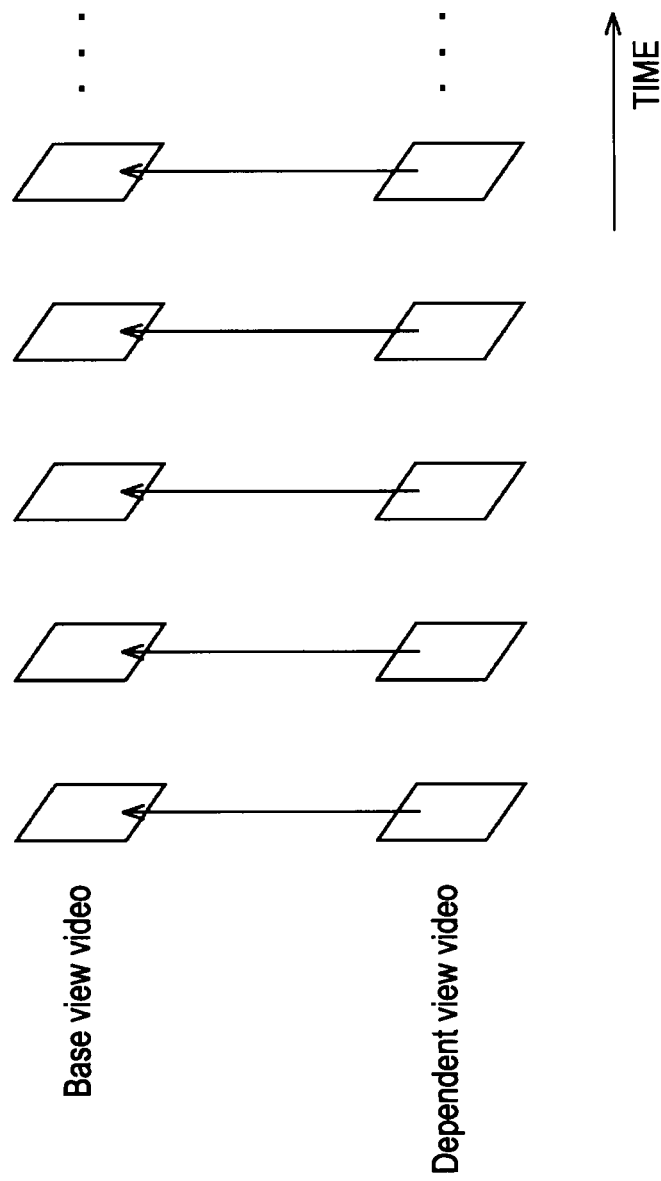
FIG. 4 illustrates an example of a reference image.

A prediction encoding in which one of other streams is used as a reference image is not permitted in the base view video. However, as shown in FIG. 4, a prediction encoding in which the base view video is used as a reference image is permitted in the dependent view video. For example, a data amount of the dependent view video stream obtained by encoding the L-view as the base view video and the R-view as the dependent view video is smaller than the data amount of the base view video stream.

In addition, since the H.264/AVC encoding is employed, prediction in a temporal direction is performed for the base view video. Also for the dependent view video, the prediction in a temporal direction is performed together with prediction between views. In order to decode the dependent view video, it is necessary to previously complete the decoding of the base view video which has been referenced during the encoding.

The dependent view video encoder 24 outputs the dependent view video stream obtained by performing the encoding using the prediction between views to the multiplexer 25.

The multiplexer 25 multiplexes the base view video stream supplied from the H.264/AVC encoder 21, the dependent view video stream (i.e., depth data) supplied from the depth calculation unit 23, the dependent view video stream supplied from the dependent view video encoder 24, for example, into a MPEG2 TS. The base view video stream and the dependent view video stream may be multiplexed into a single MPEG2 TS or may be included in separate MPEG2 TSs.

The multiplexer 25 outputs the generated TS (MPEG2 TS). The TS output from the multiplexer 25 is recorded on the optical disc 2 in the recording device together with other management data and provided to the reproducer 1 as recorded in the optical disc 2.

If it is necessary to distinguish between the dependent view video used with the base view video in the type 1 display scheme and the dependent view video (depth) used with the base view video in the type 2 display scheme, the former is denoted by a D1 view video, and the latter is denoted by a D2 view video.

In addition, a 3-D reproduction based on the type 1 display scheme using the base view video and the D1 view video is referred to as a B-D1 reproducing. A 3-D reproduction based on the type 2 display scheme using the base view video and the D2 view video is referred to as a B-D2 reproducing.

When the B-D1 reproducing is to be performed in response to a user's instruction or the like, the reproducer 1 reads the base view video stream and the D1 view video stream from the optical disc 2 and reproduces them.

When the B-D2 reproducing is to be performed, the reproducer 1 reads the base view video stream and the D2 view video stream from the optical disc 2 and reproduces them.

Furthermore, when a normal 2-D image is to be reproduced, the reproducer 1 reads only the base view video stream from the optical disc 2 and reproduces it.

Since the base view video stream is an AVC video stream encoded based on the H.264/AVC, if a player corresponding to a BD format is used, it is possible to display the 2-D image by reproducing that base view video stream.

Hereinafter, a case where the dependent view video is the D1 view video will be described. If the dependent view video is simply called, it means the D1 view video. The D2 view video is recorded on the optical disc 2 and reproduced in a similar way to the D1 view video.

Application Format

Figure 5:
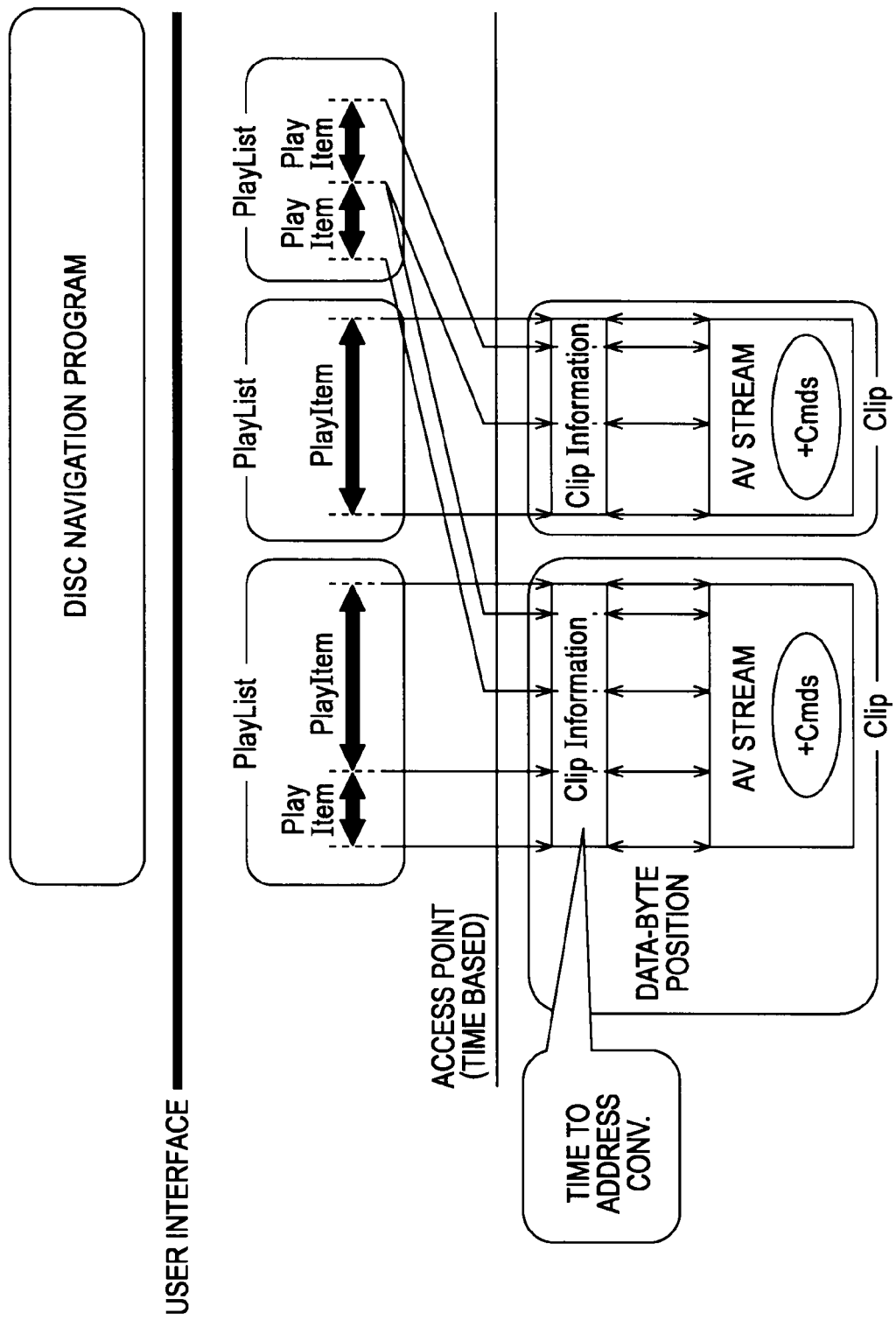
FIG. 5 illustrates an example of management of an AV stream.

FIG. 5 illustrates an example of the AV stream management using the reproducer 1.

As shown in FIG. 5, the AV stream management is performed using two layers (i.e., PlayList and Clip). The AV stream may be recorded in the local storage of the reproducer 1 as well as the optical disc 2.

Herein, a pair of a single AV stream and clip information accompanied thereby is considered as a single object and called as a clip. Hereinafter, a file storing the AV stream is referred to as an AV stream file. In addition, a file storing the clip information is referred to as a clip information file.

The AV stream is deployed on a time axis, and access points of each clip are usually specified in the PlayList using a timestamp. The clip information file is used to search for an address starting to be decoded within the AV stream.

The PlayList is a set of reproducing intervals of the AV stream. One of the reproducing intervals within the AV stream is referred to as a PlayItem. The PlayItem is represented by a pair of IN and OUT points of the reproducing interval on the time axis. As shown in FIG. 5, the PlayList includes a single of a plurality of PlayItems.

The PlayList located in the first from the left in FIG. 5 includes two PlayItems. Using the two PlayItems, a first half and a second half of the AV stream included in the left clip are referenced respectively.

The PlayList located in the second from the left includes a single PlayItem, and thus, the entire AV stream included in the right clip is referenced.

The PlayList located in the third from the left includes two PlayItems. A portion where the AV stream included in the left clip exists and a portion where the AV stream included in the right clip are referenced by the two PlayItems, respectively.

For example, when the left side PlayItem included in the first PlayList from the left is specified by the disc navigation program as a reproducing location, a first half of the AV stream included in the left side clip referenced by that PlayItem is reproduced. In this manner, the PlayList is used as the reproduction management information for managing the AV stream reproduction.

Within the PlayList, a reproduction path including a sequence of one or more PlayItems is referred to as a main path.

Within the PlayList, a reproduction path including a sequence of one or more SubPlayItems in addition to the main path is referred to as a subsidiary path (SubPath).

Figure 6:
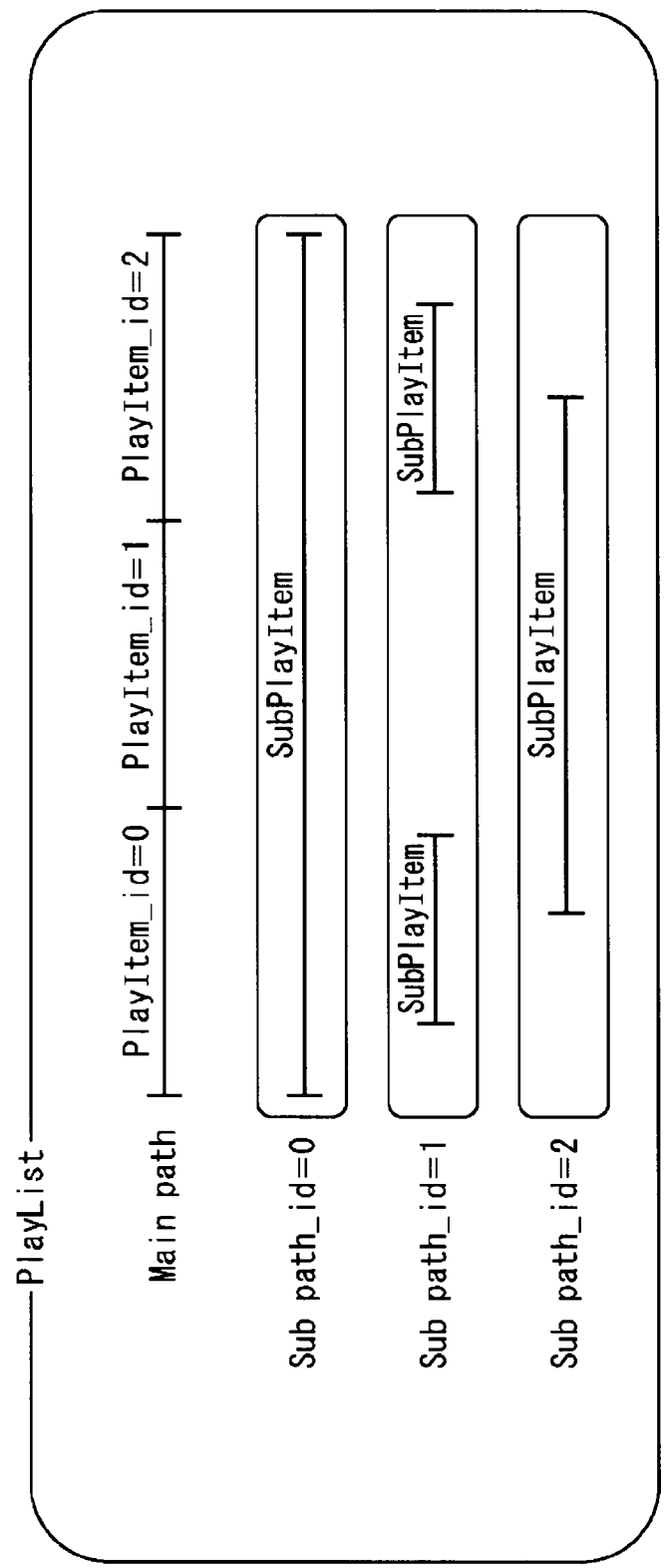
FIG. 6 illustrates a structure of a main path and a subsidiary path.

FIG. 6 illustrates a configuration of the main path and the subsidiary path.

The PlayList is allowed to have a single main path and a single subsidiary path.

The aforementioned base view video stream is managed as the stream referenced by the PlayItem included in the main path. In addition, the dependent view video stream is managed as the stream reference by the SubPlayItem included in the subsidiary path.

The PlayList of FIG. 6 includes a single main path made by a sequence of three PlayItems and three subsidiary paths.

IDs are sequentially set in the PlayItems of the main path starting from the leading end. Similarly, IDs are sequentially set in SubPlayItems of the subsidiary path starting from the leading end (e.g., Subpath_id=0, Subpath_id=1, and Subpath_id=2).

In the example shown in FIG. 6, the subsidiary path set to "Subpath_id=0" includes a single SubPlayItem. The subsidiary path set to "Subpath_id=1" includes two SubPlayItems. The subsidiary path set to "Subpath_id=2" includes a single SubPlayItem.

The clip AV stream referenced by a single PlayItem includes at least a video stream (i.e., main image data).

The clip AV stream may include one or more audio streams reproduced at the timing of (in synchronization with) the video stream of the clip AV stream or may not include the audio stream.

The clip AV stream may include one or more subtitle data streams (or presentation graphics (PG)) of bitmaps reproduced in synchronization with the video stream of the clip AV stream or may not include the subtitle data.

The clip AV stream may include one or more interactive graphics (IG) streams reproduced in synchronization with the video stream of the clip AV stream file or may not include the IG stream. The IG stream is used to display graphics such as a button manipulated by a user.

The clip AV stream referenced by a single PlayItem is obtained by multiplexing the video stream with 0 or more audio streams, 0 or more PG streams, and 0 or more IG streams reproduced in synchronization with the video stream.

A single SubPlayItem references the video stream, the audio stream, or the PG stream different (separately provided) from the clip AV stream referenced by the PlayItem.

The AV stream management using the PlayList, the PlayItem, and the SubPlayItem is disclosed in, for example, Japanese Unexamined Patent Application Publication Nos. 2008-252740 and 2005-348314.

Directory Structure

Figure 7:
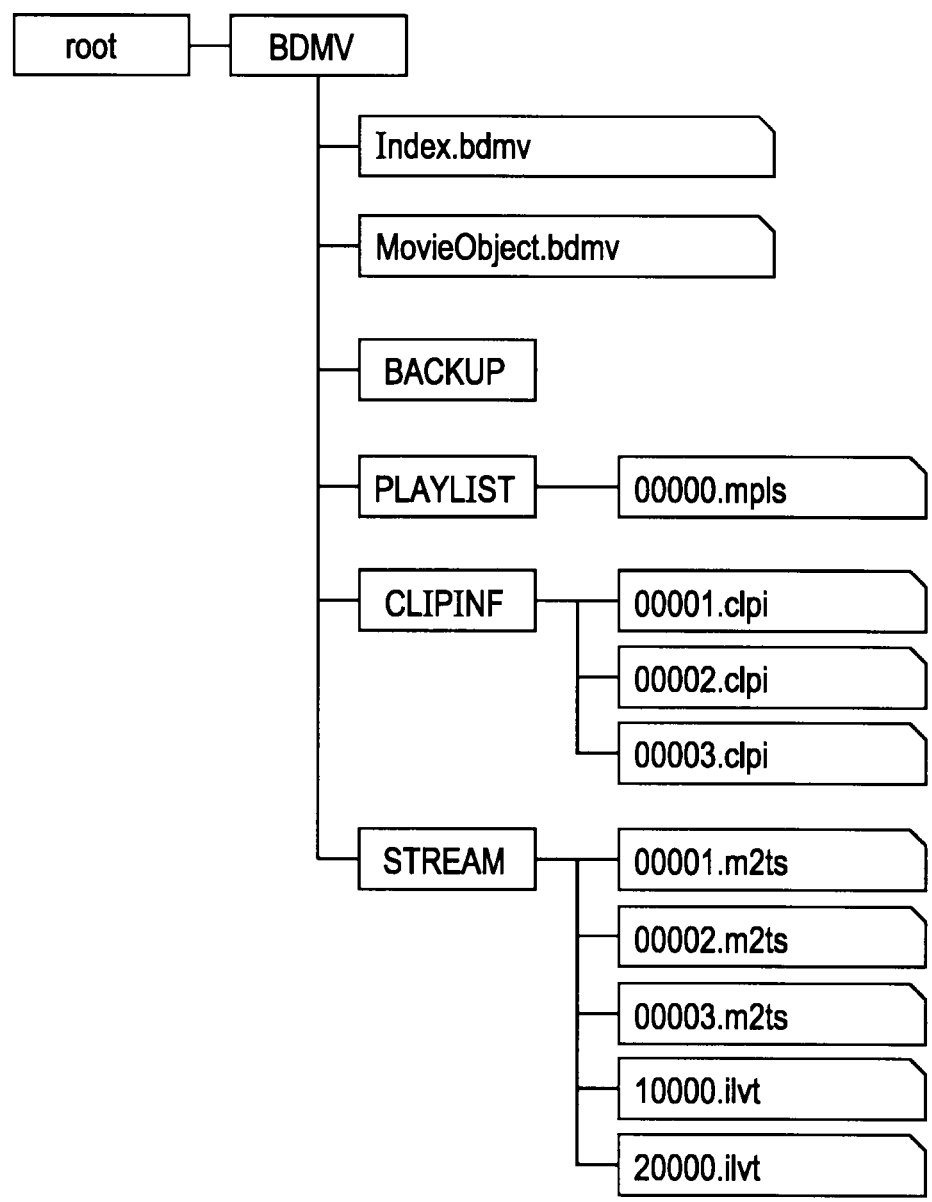
FIG. 7 illustrates an example of a management structure for files recorded on an optical disc.

FIG. 7 illustrates an example of a management structure of files recorded in the optical disc 2.

Referring to FIG. 7, files are hierarchically managed based on a directory structure. A single root directory is created on the optical disc 2. Files under the root directory are managed by a single recording reproducing system.

Under the root directory, a BDMV directory is provided. Immediately under the BDMV directory, an index file "Index.bdmv" and a MovieObject file "MovieObject.bdmv" are stored.

Under the BDMV directory, a BACKUP directory, a PLAYLIST directory, a CLIPINF directory, and a STREAM directory are provided.

The PLAYLIST directory stores PlayList files that describe the PlayLists. The name of each PlayList file is set by a combination of five numerals and an extension ".mpls". The single PlayList file shown in FIG. 7 has a file name "00000.mpls".

The CLIPINF directory stores a clip information file. The name of each clip information file is set by a combination of five numerals and an extension ".clpi".

Three clip information files shown in FIG. 7 have file names "00001.clpi," "00002.clpi," and "00003.clpi". Hereinafter, the clip information file will be referred to simply as a clpi file.

For example, the clpi file of "00001.clpi" is a file describing information on the clip of the base view video.

The clpi file of "00002.clpi" is a file describing information on the clip of the D2 view video.

The clpi file of "00003.clpi" is a file describing information on the clip of the D1 view video.

The STREAM directory stores stream files. The name of each stream file is set by a combination of five numerals and an extension ".m2ts" or a combination of five numerals and an extension ".ilvt". Hereinafter, a file having an extension ".m2ts" will be referred to simply as an m2ts file, a file having an extension ".ilvt" will be referred to as a ilvt file.

The m2ts file of "00001.m2ts" is a 2-D reproducing file, and the base view video stream is read by specifying this file.

The m2ts file of "00002.m2ts" is a file of a D2 view video stream, and the m2ts file of "00003.m2ts" is a file of a D1 view video stream.

The ilvt file of "10000.ilvt" is a B-D1 reproducing file, and the base view video stream and the D1 view video stream are read by specifying this file.

The ilvt file of "20000.ilvt" is a B-D2 reproducing file, and the base view video stream and the D2 view video stream are read by specifying this file.

Although shown in FIG. 7, under the BDMV directory, a directory for storing a file of an audio stream is also provided.

Syntax of Each Data

FIG. 8 illustrates syntax of PlayList( ) described in the PlayList file.

The field "length" is a 32-bit unsigned integer representing the number of bytes from the bit immediately after this length field to the end of the "PlayList( )." In other words, the field "length" represents the number of bytes from the field "reserved_for_future_use" to the end of the PlayList.

The field "length" is followed by a 16-bit field "reserved_for_future_use".

The field "number_of_PlayItems" is a 16-bit field representing the number of PlayItems included in the PlayList. In the case of the example of FIG. 6, the number of PlayItems is set to 3. To the value of "PlayItem_id", numbers are allocated in the order the "PlayItem( )" is provided within the PlayList starting from 0. For example, 0, 1, and 2 are allocated to the value of "PlayItem_id" of FIG. 6.

The field "number_of_SubPaths" is a 16-bit field representing the number of subsidiary paths within the PlayList. In the case of FIG. 6, the number of subsidiary paths is 3. To the value of "SubPath_id," numbers are allocated in the order the "SubPath( )" is provided within the PlayList starting from 0. For example, 0, 1, and 2 are allocated to the "Subpath_id" of FIG. 6. In the subsequent "for" sentence, the "PlayItem( )" is referenced as many as the number of PlayItems, and the "SubPath( )" is referenced as many as the number of subsidiary paths.

FIG. 9 illustrates syntax of the "SubPath( )" of FIG. 8.

The field "length" is a 32-bit unsigned integer representing the number of bytes from the bit immediately after this length field to the end of the "SubPath( )". In other words, the field "length" represents the number of bytes from the field "reserved_for_future_use" to the end of the PlayList.

The field "length" is followed by a 16-bit field "reserved_for_future_use".

The field "SubPath_type" is an 8-bit field representing a type of the application executing a process using the subsidiary path. The field "SubPath_type" is used to represent the type of the subsidiary path, for example, whether the subsidiary path is related to an audio, a bitmap subtitle, or a text subtitle. The "SubPath_type" will be described later with reference to FIG. 10.

The field "SubPath_type" is followed by a 15-bit field "reserved_for_future_use" is provided.

The field "is_repeat_SubPath" is a one-bit field for specifying a method of reproducing the subsidiary path and represents whether the subsidiary path is repetitively reproduced while the main path is reproduced or whether the subsidiary path is reproduced only a single time. For example, the field "is_repeat_SubPath" is used when the reproducing timing of the clip referenced by the main path is different from the reproducing timing of the clip referenced by the subsidiary path (such as a case where the main path is used as a path of a slideshow of still images, and the subsidiary path is used as a path of an audio such as BGM).

The field "is_repeat_SubPath" is followed by an 8-bit field "reserved_for_future_use".

The field "number_of_SubPlayItems" is an 8-bit field representing the number (entry number) of SubPlayItems within a single subsidiary path. For example, the field "number_of_SubPlayItems" of the SubPlayItem in case of SubPath_id=0 as shown in FIG. 6 is set to 1, and the field "number_of_SubPlayItems" of the SubPlayItem in case of SubPath_id=1 is set to 2. In the subsequent "for" sentence, the "SubPlayItem( )" is referenced as much as the number of SubPlayItems.

FIG. 10 illustrates an example of "SubPath_type."

In FIG. 10, "Out-of-mux" means that the streams referenced by the subsidiary path (i.e., the streams referenced by the SubPlayItem included in the subsidiary path) and the streams referenced by the main path (i.e., the streams referenced by the PlayItem included in the main path) are multiplexed in different TSs.

On the contrary, "In-of-mux" means the streams referenced by the subsidiary path and the streams referenced by the main path are multiplexed in the same TS.

"SubPath_type=0, 1" is set to "reserved."

"SubPath_type=2" is set to "Audio presentation path of the Browsable slideshow."

"SubPath_type=3" is set to "Interactive graphics presentation menu."

"SubPath_type=4" is set to "Text subtitle presentation path."

"SubPath_type=5" is set to "2nd Audio Presentation path" (a path for referencing the second audio stream). The second audio stream referenced by the subsidiary path where "SubPath_type=5" is set includes, for example, a commentary of a film director.

"SubPath_type=6" is set to "2nd Video Presentation path" (a path for referencing the second video stream). The second video stream referenced by the subsidiary path where "SubPath_type=6" is set includes, for example, a comment (e.g., a moving picture) of a film director".

"SubPath_type=7" is set to a path for one or more ESs (primary audio/PG/IG/secondary audio) or a picture-in-picture presentation path.

"SubPath_type=8 to 11" is used to define a subsidiary path for an application that executes a 3-D reproduction. Herein, difference values are set depending on the pattern of the multiplexing of the dependent view video stream referenced by the subsidiary path.

"SubPath_type=8" is set to "Out-of-mux 3D SubPath from Disc". This represents that the dependent view video stream referenced by the subsidiary path is recorded in the optical disc 2 and multiplexed in a different TS from the base view video stream referenced by the main path.

"SubPath_type=9" is set to "In-mux 3D SubPath from Disc". This means the dependent view video stream referenced by the subsidiary path is recorded on the optical disc 2 and multiplexed in the same TS as the base view video stream referenced by the main path.

"SubPath_type=10" is set to "Out-of-mux 3D SubPath from Local Storage". This means that the dependent view video stream referenced by the subsidiary path is recorded in the local storage and multiplexed in a different TS from the base view video stream referenced by the main path.

As will be described later, the reproducer 1 is enabled to execute a 3-D reproduction by downloading dependent view video stream from a server and using it together with the base view video stream recorded in the optical disc 2.

"SubPath_type=11" is set to "In-mux 3D SubPath from Local Storage". This means the dependent view video stream referenced by the subsidiary path is recorded in the local storage and multiplexed in the same TS as that of the base view video stream referenced by the main path. In this case, the base view video stream is also recorded in the local storage.

"SubPath_type=12 to 255" is set to "reserved."

In this manner, in the subsidiary path which references the dependent view video stream, a location where the referenced dependent view video stream is recorded and a value representing a multiplexing pattern for the TS are set.

As a result, the reproducer 1 can identify whether the dependent view video stream referenced by the subsidiary path is recorded in the optical disc 2 or the local storage.

The reproducer 1 can identify whether the dependent view video stream referenced by the subsidiary path is multiplexed in the same TS as that of the base view video stream or a different TS.

The reproducer 1 switches to read the base view video stream in response to the identification result.

FIG. 11 illustrates syntax of SubPlayItem(i) of FIG. 9.

The field "length" is a 16-bit unsigned integer representing the number of bytes from the bit immediately after the length field to the end of the SubplayItem( ).

The "SubPlayItem(i)" of FIG. 11 is described by dividing into a case where the parameter "SubPlayItem" references a single clip and a case where the parameter "SubPlayItem" references a plurality of clips.

Now, a case where the "SubPlayItem" references a single clip will be described.

The field "Clip_Information_file_name[0]" represents the referenced clip.

The field "Clip_codec_identifier[0]" represents a codec scheme of the clip. The field "Clip_codec_identifier[0]" is followed by the "reserved_for_future_use" field.

The field "is_multi_Clip_entries" is a flag representing whether or not the multi-clip is registered. When the "is_multi_Clip_entries" flag is turned on, the syntax where the parameter "SubPlayItem" references a plurality of clips is referenced.

The field "ref_to_STC_id[0]" represents information on an STC discontinuous point (discontinuous points in the system time base).

The field "SubPlayItem_IN_time" represents a starting position of the reproducing interval of the subsidiary path, and the "SubPlayItem_OUT_time" field represents an end position.

The field "sync_PlayItem_id" and "sync_start_PTS_of_PlayItem" represent timings for initiating to reproduce the subsidiary path on a time axis of the main path.

The fields "SubPlayItem_IN_time" "SubPlayItem_OUT_time," "sync_PlayItem_id," and "sync_start_PTS_of_PlayItem" are commonly used in the clip referenced by the parameter "SubPlayItem."

Now, a case where "if(is_multi_Clip_entries==1b" and the parameter "SubPlayItem" references a plurality of clips will be described.

The field "num_of_Clip_entries" represents the number of clips that are referenced. The field "Clip_Information_file_name[SubClip_entry_id]" designates the number of clips except for "Clip_Information_file_name[0]."

The field "Clip_codec_identifier[SubClip_entry_id]" represents a codec scheme of the clips.

The field "ref_to_STC_id[SubClip_entry_id]" represents information on the STC discontinuous point (discontinuous points in the system time base). The field "ref_to_STC_id [SubClip_entry_id]" is followed by the field "reserved_for_future_use."

FIG. 12 illustrates the syntax of the "PlayItem( )" of FIG. 8.

The field "length" is a 16-bit unsigned integer representing the number of bytes from the bit immediately after the length field to the end of the "PlayItem( )."

The field "Clip_Information_file_name[0]" represents the name of the clip information file of a clip referenced by the "PlayItem". In addition, the same five numerals are included in the file name of the mt2s file containing the clips and the file name of the corresponding clip information file.

The field "Clip_codec_identifier[0]" represents a codec scheme of the clip. The field "Clip_codec_identifier[0]" is followed by the field "reserved_for_future_use." The field "reserved_for_future_use" is followed by the fields "is_multi_angle," and "connection_condition."

The field "ref_to_STC_id[0]" represents information on the STC discontinuous point (discontinuous points in the system time base).

The field "IN_time" represents the initiation position of the reproducing interval of the "PlayItem," and the field "OUT_time" represents the end position.

The field "OUT_time" is followed by the fields "UO_mask_table( )" "PlayItem_random_access_mode," and "still_mode."

"STN_table( )" includes information on the AV stream referenced by a target PlayItem. If a subsidiary path reproduced in relation to the target PlayItem exists, the information on the AV stream referenced by the SubPlayItem included in that subsidiary path is also included.

FIG. 13 illustrates the syntax of the "STN_table( )" of FIG. 12.

"STN_table( )" is set using the attribute of the PlayItem.

The field "length" is a 16-bit unsigned integer representing the number of bytes from the bit immediately after the length field to the end of the "STN_table( )." The field "length" is followed by the 16-bit field "reserved_for_future_use."

The field "number_of_video_stream_entries" represents the number of streams, where the "video_stream_id" is provided, entered (registered) within the "STN_table( )."

The field "video_stream_id" describes information for identifying the video stream. For example, the ID of the base view video stream is specified by this description. The ID of the dependent view video stream may be defined within "STN_table( )" or may be obtained by calculation as will be described later.

The field "video_stream_number" represents the video stream number observed by a user and used in the video conversion.

The field "number_of_audio_stream_entries" represents the number of streams of first audio stream corresponding to the "audio_stream_id," entered within the "STN_table( )". The field "audio_stream_id" represents information for identifying the audio stream, and the field "audio_stream_number" represents the audio stream number observed from a user and used in the audio conversion.

The field "number_of_audio_stream2_entries" represents the number of streams of the second audio stream corresponding to the "audio_stream_id2," entered within the "STN_table( )". The field "audio_stream_id2" represents information for identifying the audio stream, and the field "audio_stream_number" represents the audio stream number observed by a user and used in the audio conversion. In this example, the audio to be reproduced can be switched.

The field "number_of_PG_txtST_stream_entries" represents the number of streams corresponding to the "PG_txtST_stream_id," entered within the "STN_table( )". In this case, the PG stream obtained by performing the run-length encoding for the bitmap subtitles such as a sub-picture of the DVD and the text subtitle "file(txtST)" are entered. The field "PG_txtST_stream_id" represents information for identifying the subtitle stream, and the field "PG_txtST_stream_number" represents the subtitle stream number observed by a user and used in the subtitle conversion.

The field "number_of_IG_stream_entries" represents the number of streams corresponding to the "IG_stream_id," entered within the "STN_table( )." In this case, the IG streams are entered. The field "IG_stream_id" represents the information for identifying the interactive graphics stream, and the field "IG_stream_number" represents the graphics stream number observed by a user and used in the graphics conversion.

The IDs of the main TS and subsidiary TS, which will be described later, are also registered in the "STN_table( )." A fact that that ID is not the ID of the elementary stream but the ID of the TS is described in the field "stream_attribute( )."

FIG. 14 illustrates an example of the "application_type."

The "application_type" is described in the clip information file "ClipInfo( )." A single clip information file is provided for each clip.

The "application_type=0" is set to "reserved".

The "application_type=1" represents that the TS (clip) corresponding to the clip information file including the description thereof is a TS for the movie application.

The "application_type=2" represents that the TS corresponding to the clip information file including the description thereof is a TS for the time-based slideshow.

The "application_type=3" represents that the TS corresponding to the clip information file including the description thereof is a TS for the browsable slideshow.

The "application_type=4" represents that the TS corresponding to the clip information file including the description thereof is a TS for the subsidiary path of the browsable slideshow.

The "application_type=5" represents that the TS corresponding to the clip information file including the description thereof is a TS for the subsidiary path of the interactive graphics.

The "application_type=6" represents that the TS corresponding to the clip information file including the description thereof is a TS for the text subtitle (text subtitle data) of the subsidiary path.

The "application_type=7" represents that the TS corresponding to the clip information file including the description thereof is a TS for the subsidiary path including one or more ESs.

The "application_type=8" represents that the TS corresponding to the clip information file including the description thereof is a TS for the application which performs the 3-D reproduction.

The "application_type=9 to 255" is set to "reserved."

In this manner, values for the application for executing the 3-D reproduction are defined using the "application_type". As a result, the application for executing the 3-D reproduction is enabled to identify the TS to be managed by itself based on the value of "application_type".

Example of Setting Application_Type and SubPath_Type

Figure 15:
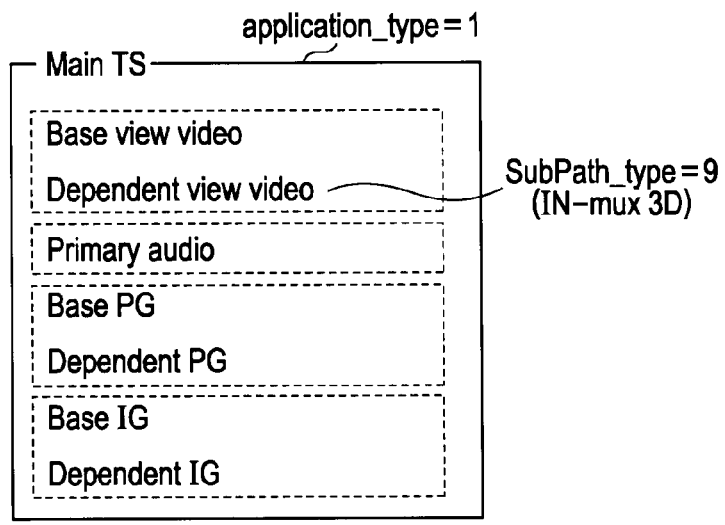
FIG. 15 illustrates an example of setting application_type and SubPath_type.

FIG. 15 illustrates an example of setting "application_type" and "SubPath_type".

In the main TS of FIG. 15, the base view video stream, the dependent view video stream, the primary audio stream, the base PG stream, the dependent PG stream, the base IG stream, and the dependent IG stream are multiplexed. In this manner, the dependent view video stream may be included in the main TS together with the base view video stream.

The main TS and the subsidiary TS are recorded in the optical disc 2. The main TS includes at least a base view video stream. The subsidiary TS is a TS including the streams except for the base view video stream and used together with the main TS.

Similar to the video, each of base and dependent streams is also provided for the PG and IG in order to allow the 3-D image to be displayed.

Planes of the base views of the PG and IG obtained by decoding each stream are synthesized and displayed with a plane of the base view video obtained by decoding the base view video stream. Similarly, the plane of the dependent view of the PG and IG is synthesized and displayed with the plane of the dependent view video obtained by appropriately decoding the dependent view video stream.

For example, when the base view video stream is an L-view stream, and the dependent view video stream is an R-view stream, the stream of that base view becomes a stream of the L-view graphics also for the PG and IG. In addition, the PG stream and the IG stream of the dependent view become the stream of the R-view graphics.

Meanwhile, when the base view video stream is an R-view stream, and the dependent view video stream is an L-view stream, the stream of that base view becomes a stream of the R-view graphics also for the PG and IG. In addition, the PG stream and the IG stream of the dependent view become the stream of the L-view graphics.

A value of the "application_type" of the main TS (the application type described in the clip information file corresponding to the main TS) is set to 1.

The base view video stream included in the main TS is also a stream managed by the movie application which is an application for a typical 2-D reproduction as described above as well as an application for the 3-D reproduction. In the TS managed by both the movie application and the 3-D reproduction application, 1 is set as the value of the "application_type".

In addition, since it is included in the same TS as that of the base view video stream, a value of the "SubPath_type" of the subsidiary path which references the dependent view video stream is set to 9. In this example, the dependent view video stream is recorded in the optical disc 2.

Figure 16:
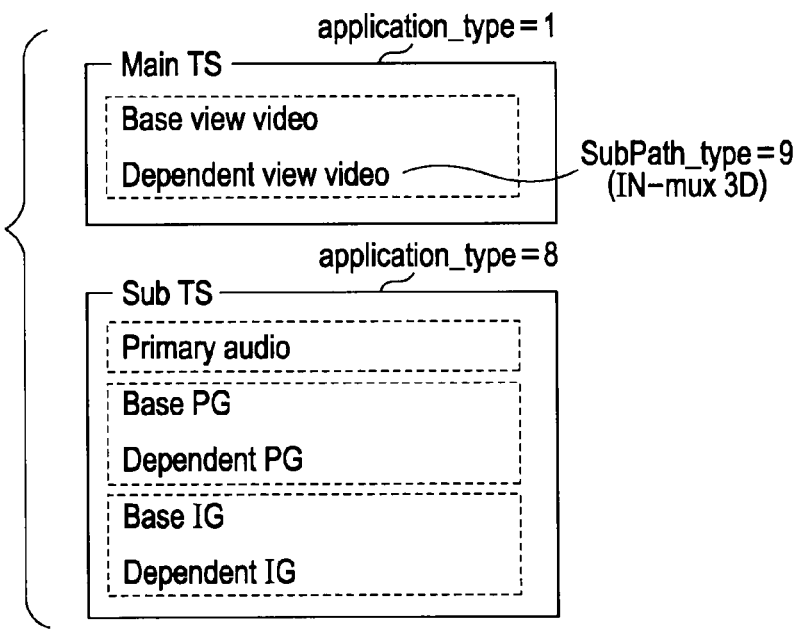
FIG. 16 illustrates another example of setting application_type and SubPath_type.

FIG. 16 illustrates another example of setting "application_type" and "SubPath_type".

In the main TS of FIG. 16, the base view video stream and the dependent view video stream are multiplexed.

A value of the "application_type" of the main TS is set to 1.

Since it is included in the same TS as that of the base view video stream, the value of the "SubPath_type" of the subsidiary path which references the dependent view video stream is set to 9. Also in this example, the dependent view video stream is recorded in the optical disc 2.

The subsidiary TS of FIG. 16 includes the primary audio stream, the base PG stream, the dependent PG stream, the base IG stream, and the dependent IG stream.

Since it is the TS managed by the application for executing the 3-D reproduction, a value of the "application_type" of the subsidiary TS is set to 8.

Figure 17:
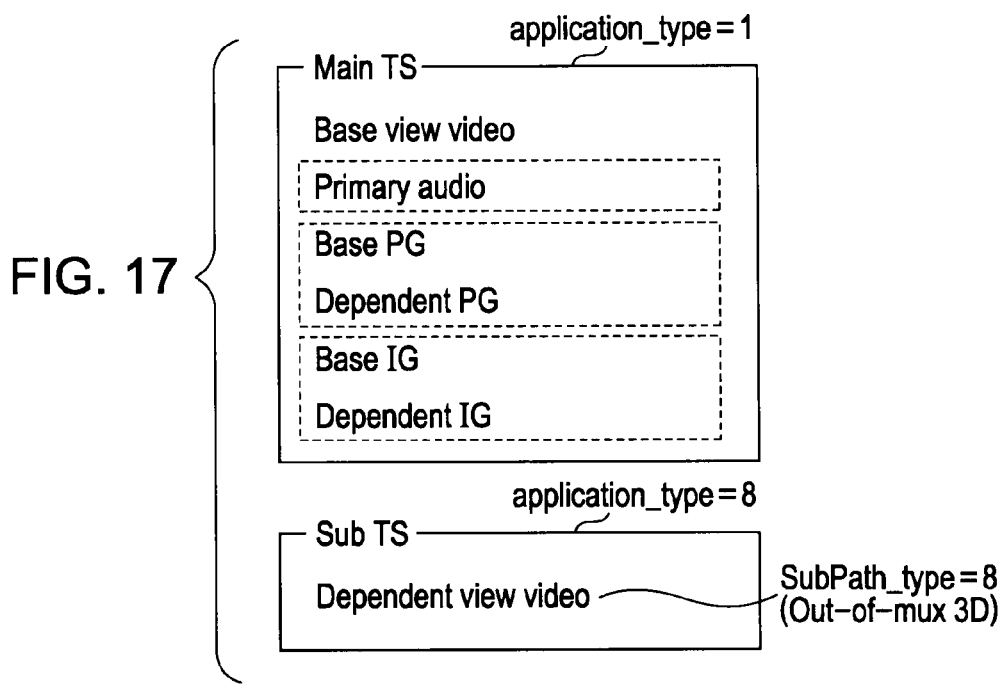
FIG. 17 illustrates still another example of setting application_type and SubPath_type.

FIG. 17 illustrates still another example of setting "application_type" and "SubPath_type".

In the main TS of FIG. 17, the base view video stream, the primary audio stream, the base PG stream, the dependent PG stream, the base IG stream, and the dependent IG stream are multiplexed.

The value of the "application_type" of the main Ts is set to 1.

In the subsidiary TS of FIG. 17, the dependent view video stream is included.

Since a different TS from that of the base view video stream is included, a value of the "SubPath_type" of the subsidiary path which references the dependent view video stream is set to 8. Also in this example, the dependent view video stream is recorded in the optical disc 2.

In this manner, in the clip information file corresponding to the subsidiary TS managed by an application executing the 3-D reproduction, a value for representing that the TS is managed by the application executing the 3-D reproduction is set by using the value of "application_type."

In the subsidiary path which references the dependent view video stream, a value corresponding to the pattern of the multiplexing and a location where that dependent view video stream is recorded is set by using the "SubPath_type".

Furthermore, according to the BD standard, the number of TSs that can be simultaneously read from the optical disc 2 is limited to 2.

In the browsable slideshow, as described above, it is envisaged that the audio stream used as the BGM is referenced by the subsidiary path (SubPath_type=2) in addition to the video stream (the stream of the slideshow of a still image) referenced by the main path. During the reproduction of the slideshow, the video stream referenced by the main path and the audio stream referenced by the subsidiary path are simultaneously read.

Here, a 3-D display of the slideshow of the still images will be considered. When the base view video stream and the dependent view video stream as a video stream are included in different TSs, two TSs can be read. However, it may be difficult to read the audio stream used as the BGM.

In this regard, it is operated such that only "SubPath_type=9 or 11" can be set for the browsable slideshow (Application_type=3). As a value of the "SubPath_type" of the subsidiary path which references the dependent view video stream included in the TS managed by the browsable slideshow application, a value of 8 or 10 is not set, which means that it is included in the TS different from that of the base view video stream.

As a result, by limiting the value that can be set by using the value of "SubPath_type" based on the "Application_type," it may avoid a difficulty in reading the TS.

Definition of Stream_Id

As described with reference to FIG. 13, the IDs of each stream (stream_id) referenced by the PlayItem and the SubPlayItem are managed in the "STN_table".

The "video_stream_id" managed in the STN_table represents the ID of the base view video stream, and the "PG_txtST_stream_id" represents the ID of the base PG stream. In addition, the "IG_stream_id" represents the ID of the base IG stream.

Here, for the stream of the dependent view, each "stream_id" is not registered in the STN_table, but is derived from calculation using the "stream_id" of the stream of the base view.

For example, the "stream_id" of the dependent view video stream is defined in the following equation (1).

$$\text{video\_stream\_id} + x = \text{dependent\_view\_video\_stream\_id} \quad (1)$$

The "stream_id" of the dependent PG stream is defined in the following equation (2).

$$\text{PG\_textST\_stream\_id} + x = \text{Dependent\_PG\_textST\_stream\_id} \quad (2)$$

The "stream_id" of the dependent IG stream is defined in the following equation (3).

$$\text{IG\_stream\_id} + x = \text{Dependent\_IG\_stream\_id} \quad (3)$$

The value of x in the equations (1) to (3) is arbitrarily set. Different values may be input as the value of x in the equations (1) to (3).

The value of x may be specified from the STN_table or may be previously set in the reproducer 1.

As a result, the recording device which records the data in the optical disc 2 is terminated without setting, in the STN_table, the "stream_id" of the dependent view stream in addition to the "stream_id" of the base view stream.

In addition, if the "stream_id" of the base view stream is specified from the "STN_table," the reproducer 1 can specify the "stream_id" of the corresponding dependent view stream from calculation.

According to the BD standard, various processes using the stream are implemented by a JAVA (registered trademark) application.

Figure 18:
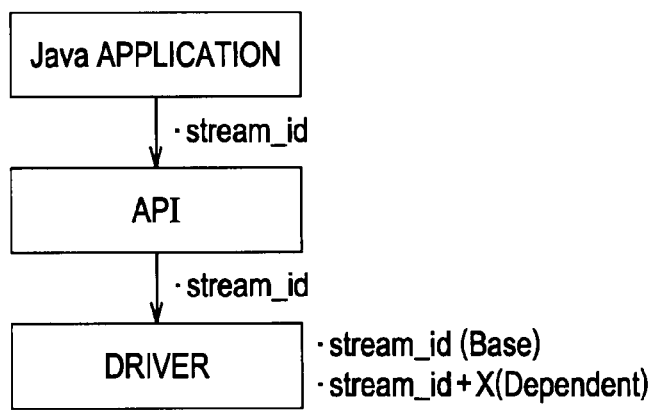
FIG. 18 illustrates an example of specifying stream_id using a JAVA (registered trademark) application.

For example, when any process using a stream is executed, as shown in FIG. 18, the JAVA (registered trademark) application instructs the driver to read the stream by specifying the "stream_id" using an API (Application Programming Interface).

The driver sets the "stream_id" specified from the JAVA (registered trademark) application using the API as the "stream_id" of the base view stream and specifies the "stream_id" of the dependent view stream by calculation based on that. In addition, based on the specified "stream_id," the base view stream and the dependent view stream are read.

As a result, even when the 3-D display is executed, only one "stream_id" is specified by the JAVA (registered trademark) application using the API. In addition, it is necessary to extend the API so that two "stream_ids" can be specified for the base view and the dependent view.

Since the ID of the dependent view stream is automatically calculated from the ID of the base view stream, the following advantages can be obtained.

In the BD, an algorithm for allowing a player to automatically select a reproduced stream is provided. For example, this algorithm is used to automatically determine which subtitle is to be reproduced when any English video is reproduced.

If the stream ID is also allocated to the dependent view stream, the stream reproduction selection algorithm provided in the existing player is similarly to be executed for the dependent view, and thus, the processing load in the player increases. In other words, after the player executes the processing of the stream reproduction selection algorithm by focusing on the base view stream, it is necessary to execute the stream reproduction selection algorithm by focusing on the dependent view stream.

As described above, it is possible to avoid the processing executed by focusing on the dependent view stream by automatically calculating the ID of the dependent view stream from the ID of the base view stream.

Example of Description of PlayList File

FIG. 19 illustrates the syntax of the PlayList file.

The PlayList file is a file where the extension ".mpls" stored in the PLAYLIST directory of FIG. 7 is set.

Each description described with reference to FIG. 8 is included in the PlayList file.

The "type_indicator" of FIG. 19 represents a type of the file "xxxxx.mpls".

The "version_number" represents a version number of the "xxxx.mpls". The "version_number" contains four numerals. For example, "0240" representing a "3D Spec version" is set in the PlayList file for a 3-D reproduction.

The "PlayList_start_address" represents the leading-end address of the "PlayList( )" in the unit of a relative byte number starting from the leading-end byte of the PlayList file.

The "PlayListMark_start_address" represents the leading-end address of the "PlayListMark( )" in the unit of a relative byte number starting from the leading-end byte of the PlayList file.

The "ExtensionData_start_address" represents the leading-end address of the "ExtensionData( )" in the unit of a relative byte number starting from the leading-end byte of the PlayList file.

The "ExtensionData_start_address" is followed by a 160-bit field "reserved_for_future_use".

In the "AppInfoPlayList( )", parameters for controlling reproduction of the PlayList such as a reproduction limitation are stored.

In the "PlayList( )", parameters relating to the main path or the subsidiary path as described with reference to FIG. 8 are stored.

In the "PlayListMark( )," mark information of the PlayList, i.e., information on a jump destination (or jump point) in a user operation or command for instructing a chapter jump or the like is stored.

In the "ExtensionData( )," private data can be inserted.

FIG. 20 illustrates an example of a description of the PlayList file.

As shown in FIG. 20, a 2-bit field "3D_PL_type" and a 1-bit field "view_type" are described in the PlayList file.

The field "3D_PL_type" represents a type of the PlayList.

The field "view_type" represents whether the base view video stream of which reproduction is managed by the PlayList is an L-view stream or an R-view stream. The field "view_type" may represent whether the dependent view video stream is an L-view stream or an R-view stream.

FIG. 21 illustrates meaning of a value of the "3D_PL_type".

A value of the "3D_PL_type" of "00" represents a PlayList for the 2-D reproduction.

A value of the "3D_PL_type" of "01" represents a PlayList for the B-D1 reproduction out of the 3-D reproduction types.

A value of the "3D_PL_type" of "10" represents a PlayList for B-D2 reproduction out of the 3-D reproduction types.

For example, a value of the "3D_PL_type" is "01" or "10", 3-D PlayList information is registered in the "Extension Data( )" of the PlayList file. For example, a file name of a clpi file corresponding to the clip of the dependent view video stream is registered (in the example of FIG. 7, "00002.clpi") as the 3-D PlayList information.

FIG. 22 illustrates meaning of a value of the "view_type".

A value of the "view_type" of 0 represents that the base view video stream is the L-view stream when the 3-D reproduction is executed. When the 2-D reproduction is executed, it represents that the base view video stream is the AVC video stream.

A value of the "view_type" of 1 represents that the base view video stream is the R-view stream.

By describing the "view_type" in the PlayList file, the reproducer 1 is allowed to identify whether the base view video stream is the L-view stream or the R-view stream.

For example, when the video signal is output to the display device 3 using the HDMI cable, the reproducer 1 is demanded to output by distinguishing between the L-view signal and the R-view signal.

By identifying whether the base view video stream is the L-view stream or the R-view stream, the reproducer 1 is allowed to output the L-view and R-view signals by distinguishing therebetween.

Configuration Example of Reproducer 1

Figure 23:
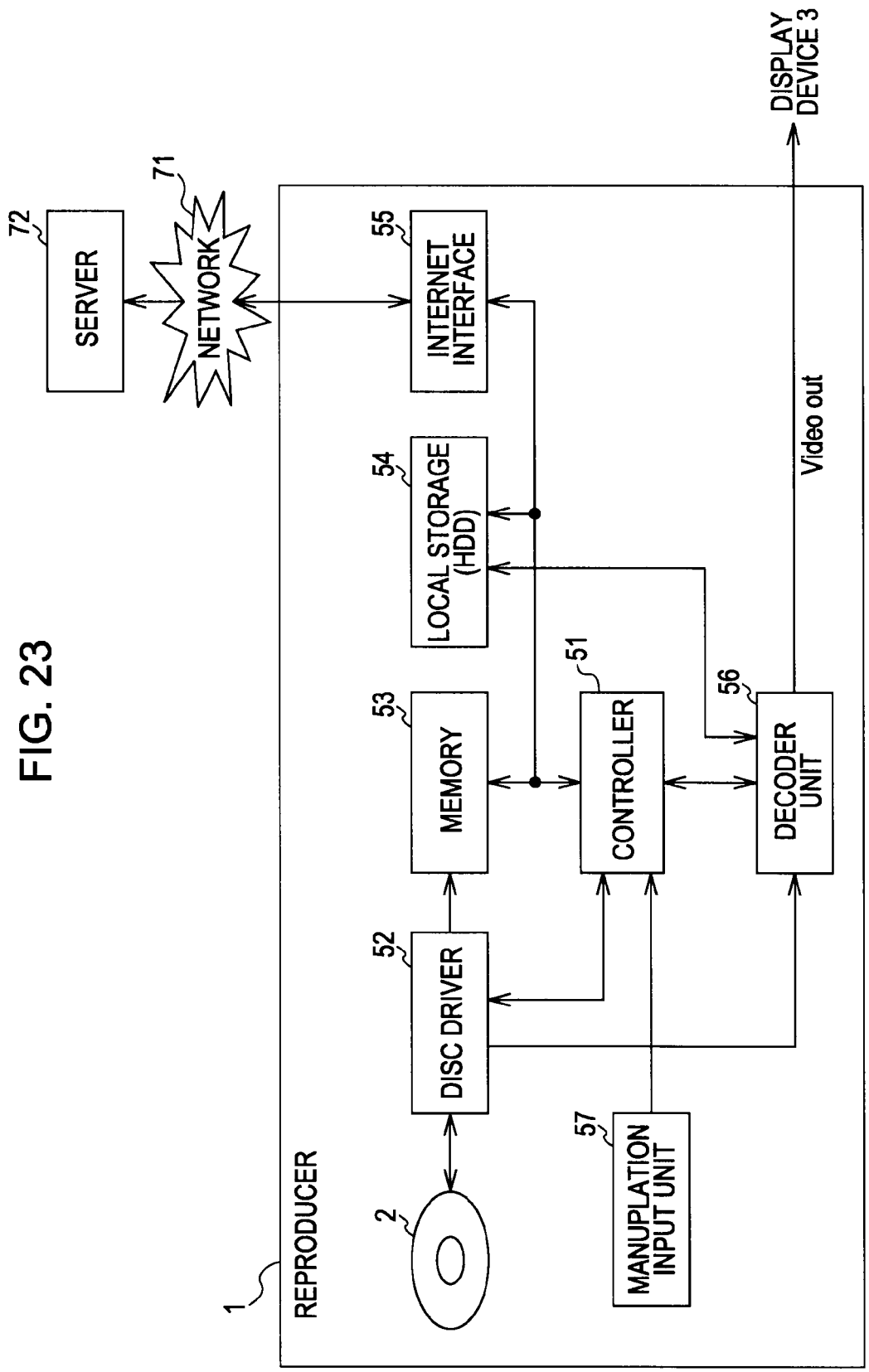
FIG. 23 is a block diagram illustrating a configuration example of a reproducer.

FIG. 23 is a block diagram illustrating a configuration example of the reproducer 1.

The controller 51 executes a control program that has been previously prepared and controls all operations of the reproducer 1.

For example, the controller 51 controls the disc driver 52 to read the PlayList file for the 3-D reproduction. The controller 51 reads the main TS and the subsidiary TS based on the ID registered in the STN_table and supplies them to the decoder unit 56.

The disc driver 52 reads data from the optical disc 2 according to the control of the controller 51 and outputs the read data to the controller 51, the memory 53, or the decoder unit 56.

The memory 53 appropriately stores data or the like demanded by the controller 51 to execute various processes.

The local storage 54 includes, for example, an HDD (Hard Disk Drive). The dependent view video streams or the like downloaded from the server 72 are recorded in the local storage 54. The streams recorded in the local storage 54 are also appropriately supplied to the decoder unit 56.

The Internet interface 55 performs communication to the server 72 via a network 71 under the control of the controller 51 and supplies the data downloaded from the server 72 to the local storage 54.

From the server 72, data for updating the data recorded in the optical disc 2 are downloaded. It is possible to implement the 3-D reproduction of different contents from those of the optical disc 2 by allowing the downloaded dependent view video stream to be used together with the base view video stream recorded in the optical disc 2. When the dependent view video stream is downloaded, the contents of the PlayList are also appropriately updated.

The decoder unit 56 decodes the streams supplied from the disc driver 52 or the local storage 54 and outputs the video signal obtained through the decoding to the display device 3. The audio signal is also output to the display device 3 via a predetermined path.

The manipulation input unit 57 includes an input device such as a button, a key, a touch panel, a jog dial, and a mouse or a receiver unit which receives a signal of infrared or the like transmitted from a predetermined remote commander. The manipulation input unit 57 detects a user's manipulation and supplies a signal indicating the content of the detected manipulation to the controller 51.

Figure 24:
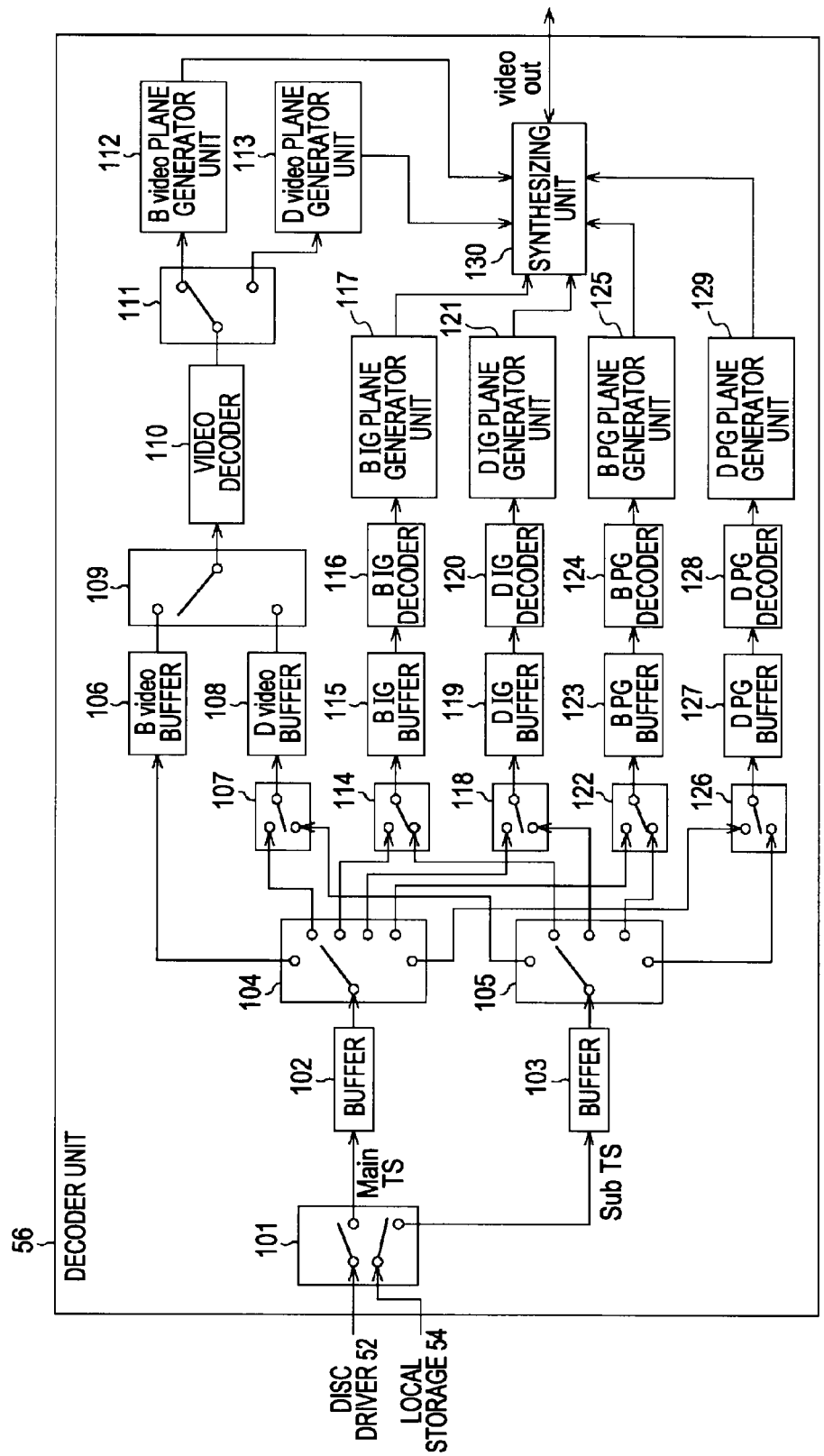
FIG. 24 illustrates a configuration example of a decoder unit of FIG. 23.

FIG. 24 illustrates a configuration example of the decoder unit 56.

FIG. 24 illustrates a configuration for executing a video signal processing. The decoder unit 56 also decodes the audio signal. The result of the decoding process performed for the audio signal is output to the display device 3 via any path (not shown).

The PID filter 101 identifies whether the TS supplied from the disc driver 52 or the local storage 54 is a main TS or a subsidiary TS based on the ID of the stream or the PID of the packet included in the TS. The PID filter 101 outputs the main TS to the buffer 102 and also outputs the subsidiary TS to the buffer 103.

The PID filter 104 sequentially reads the packets of the main TS stored in the buffer 102 and distributes them based on their PIDs.

For example, the PID filter 104 outputs the packets of the base view video stream included in the main TS to the B video buffer 106 and also outputs the packets of the dependent view video stream to the switch 107.

In addition, the PID filter 104 outputs the packets of the base IG stream included in the main TS to the switch 114 and also outputs the packets of the dependent IG stream to the switch 118.

The PID filter 104 outputs the packets of the base PG stream included in the main TS to the switch 122 and also outputs the packets of the dependent PG stream to the switch 126.

As described with reference to FIG. 15, the base view video stream, the dependent view video stream, the base PG stream, the dependent PG stream, the base IG stream, and the dependent IG stream may be multiplexed in the main TS.

The PID filter 105 sequentially reads the packets of the subsidiary TS stored in the buffer 103 and distributes them based on their PIDs.

For example, the PID filter 105 outputs the packets of the dependent view video stream included in the subsidiary TS to the switch 107.

In addition, the PID filter 105 outputs the packets of the base IG stream included in the subsidiary TS to the switch 114 and also outputs the packets of the dependent IG stream to the switch 118.

The PID filter 105 outputs the packets of the base PG stream included in the subsidiary TS to the switch 122 and also outputs the packets of the dependent PG stream to the switch 126.

As described with reference to FIG. 17, the dependent view video stream may be included in the subsidiary TS. In addition, as described with reference to FIG. 16, the base PG, the dependent PG stream, the base IG stream, and the dependent IG stream may be multiplexed in the subsidiary TS.

The switch 107 outputs the packets of the dependent view video stream supplied from the PID filter 104 or the PID filter 105 to the D video buffer 108.

The switch 109 sequentially reads the packets of the base view video stored in the B video buffer 106 and the packets of the dependent view video stored in the D video buffer 108 according to the timing information which defines the decoding timing. For example, the same timing information is set in the packet which stores data on the picture where the base view video exists and the packet which stores data on the picture of the corresponding dependent view video.

The switch 109 outputs the packets read from the B video buffer 106 or the D video buffer 108 to the video decoder 110.

The video decoder 110 decodes the packets supplied from the switch 109 and outputs data of the dependent view video or the base view video obtained by decoding the packets to the switch 111.

The switch 111 outputs the data obtained by decoding the packets of the base view video to the B video plane generator unit 112 and also outputs the data obtained by decoding the packet of the dependent view video to the D video plane generator unit 113.

The B video plane generator unit 112 generates a plane of the base view video based on the data supplied from the switch 111 and outputs the plane to the synthesizing unit 130.

The D video plane generator unit 113 generates a plane of the dependent view video based on the data supplied from the switch 111 and outputs the plane to the synthesizing unit 130.

The switch 114 outputs the packets of the base IG stream supplied from the PID filter 104 or 105 to the B IG buffer 115.

The B IG decoder 116 decodes the packets of the base IG stream stored in the B IG buffer 115 and outputs the data obtained by decoding the packets to the B IG plane generator unit 117.

The B IG plane generator unit 117 generates a plane of the Base IG based on the data supplied from the B IG decoder 116 and outputs the plane to the synthesizing unit 130.

The switch 118 outputs the packets of the dependent IG stream supplied from the PID filter 104 or 105 to the D IG buffer 119.

The D IG decoder 120 decodes the packets of the dependent IG stream stored in the D IG buffer 119 and outputs the data obtained by decoding the packets to the D IG plane generator unit 121.

The D IG plane generator unit 121 generates a plane of the dependent IG based on the data supplied from the D IG decoder 120 and outputs the plane to the synthesizing unit 130.

The switch 122 outputs the packets of the base PG stream supplied from the PID filter 104 or 105 to the B PG buffer 123.

The B PG decoder 124 decodes the packets of the base PG stream stored in the B-PG buffer 123 and outputs the data obtained by decoding the packets to the B PG plane generator unit 125.

The B PG plane generator unit 125 generates a plane of the base PG based on the data supplied from the B PG decoder 124 and outputs the plane to the synthesizing unit 130.

The switch 126 outputs the packets of the dependent PG stream supplied from the PID filter 104 or 105 to the D PG buffer 127.

The D PG decoder 128 decodes the packets of the dependent PG stream stored in the D PG buffer 127 and outputs the data obtained by decoding the packets to the D PG plane generator unit 129.

The D PG plane generator unit 129 generates a plane of the dependent PG based on the data supplied from the D PG decoder 128 and outputs the plane to the synthesizing unit 130.

The synthesizing unit 130 synthesizes the plane of the base view video supplied from the B video plane generator unit 112, the plane of the Base IG supplied from the B IG plane generator unit 117, and the plane of the base PG supplied from the B PG plane generator unit 125 by sequentially overlapping them to generate a plane of the base view.

The synthesizing unit 130 synthesizes the plane of the dependent view video supplied from the D video plane generator unit 113, the plane of the dependent IG supplied from the D IG plane generator unit 121, and the plane of the dependent PG supplied from the D PG plane generator unit 129 by sequentially overlapping them to generate a plane of the dependent view.

The synthesizing unit 130 outputs the data of the plane of the base view and the data of the plane of the dependent view. The video data output from the synthesizing unit 130 is output to the display device 3 to perform the 3OD display by alternately displaying the plane of the base view and the plane of the dependent view.

Configuration Example of Recording Device

Figure 25:
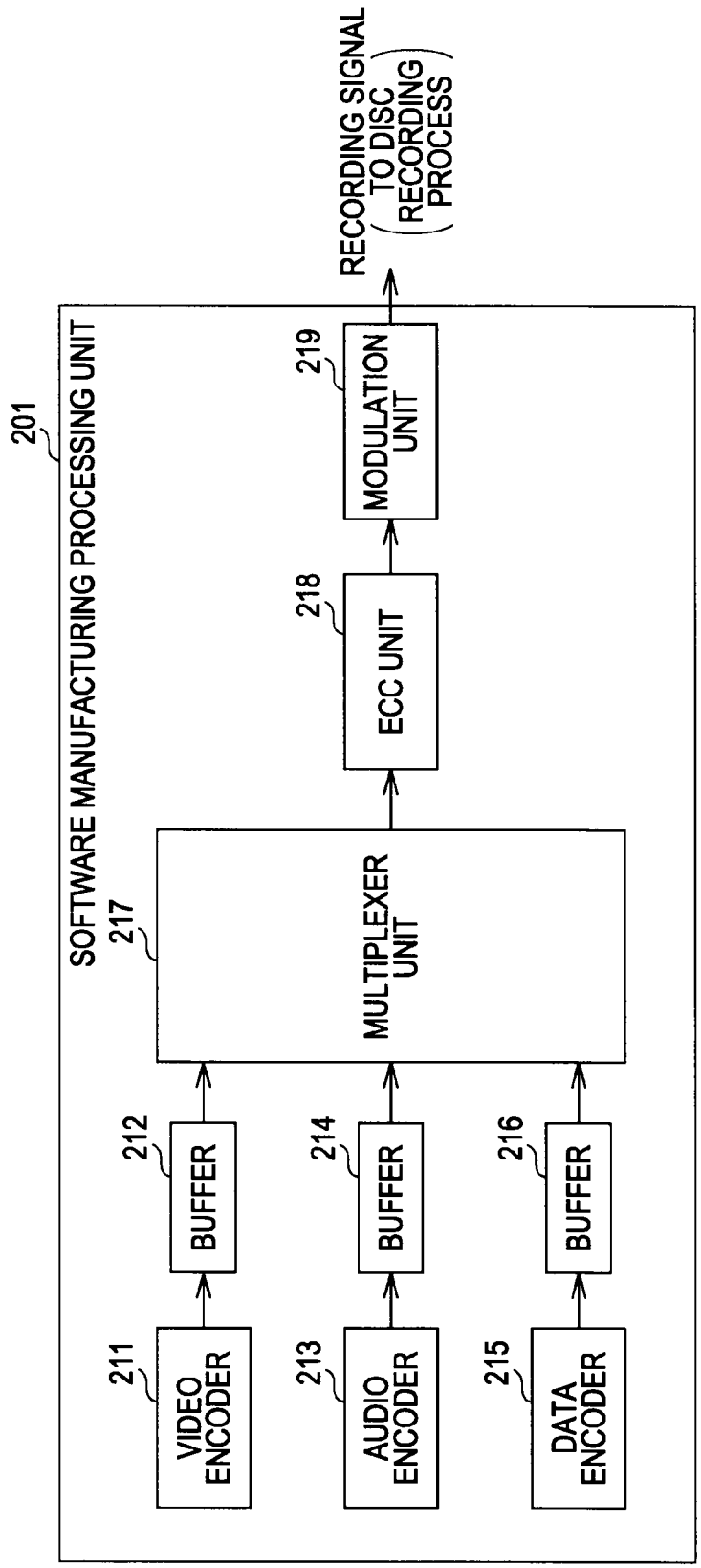
FIG. 25 is a block diagram illustrating a configuration example of a software manufacturing processing unit.

FIG. 25 is a block diagram illustrating a configuration example of the software manufacturing processing unit 201.

The video encoder 211 includes the same configuration as that of the MVC encoder 11 of FIG. 3. The video encoder 211 generates the base view video streams and the dependent view video streams by encoding a plurality of video data according to the H.264 AVC/MVC and outputs them to the buffer 212.

The audio encoder 213 outputs the data obtained by encoding the input audio streams to the buffer 214. To the audio encoder 213, the audio streams recorded in the disc together with the base view video streams and the dependent view video streams are input.

The data encoder 215 encodes various data such as the PlayList file described above in addition to the video and audio data and outputs the data obtained by the encoding to the buffer 216.

For example, the data encoder 215 sets "8" as a value of the "application_type" of the clip information file corresponding to the subsidiary TS including the dependent view video stream. The "application_type=8" means that the application executing the process using the dependent view video stream is an application which executes the 3-D reproduction.

In addition, the data encoder 215 sets in the PlayList whether the dependent view video stream is multiplexed in the same TS as that of the base view video stream and the "SubPath_type" corresponding to the recording location. The recording location of the dependent view video stream is the optical disc 2 or the local storage 54.

Furthermore, when, in the side of the reproducer 1, the dependent view stream is calculated based on the ID of the base view stream, the data encoder 215 sets a value of x used in that calculation in a predetermined location such as "STN_table( )."

The data encoder 215 sets in the PlayList file the "view_type" representing whether the base view video stream is L-view stream or the R-view stream according to the encoding of the video encoder 211.

The multiplexer unit 217 multiplexes the video data, the audio data, and the data stored in each buffer except for the stream together with the synchronization signal and outputs them to the error correction coding (ECC) unit 218.

The error correction coding (ECC) unit 218 adds the error correction code to the data multiplexed by the multiplexer unit 217.

The modulator unit 219 modulates the data supplied from the error correction coding (ECC) unit 218 and outputs the modulation result. The output of the modulator unit 219 is software recorded in the optical disc 2 that can be reproduced by the reproducer 1.

The software manufacturing processing unit 201 having such a configuration is installed in the recording device.

Figure 26:
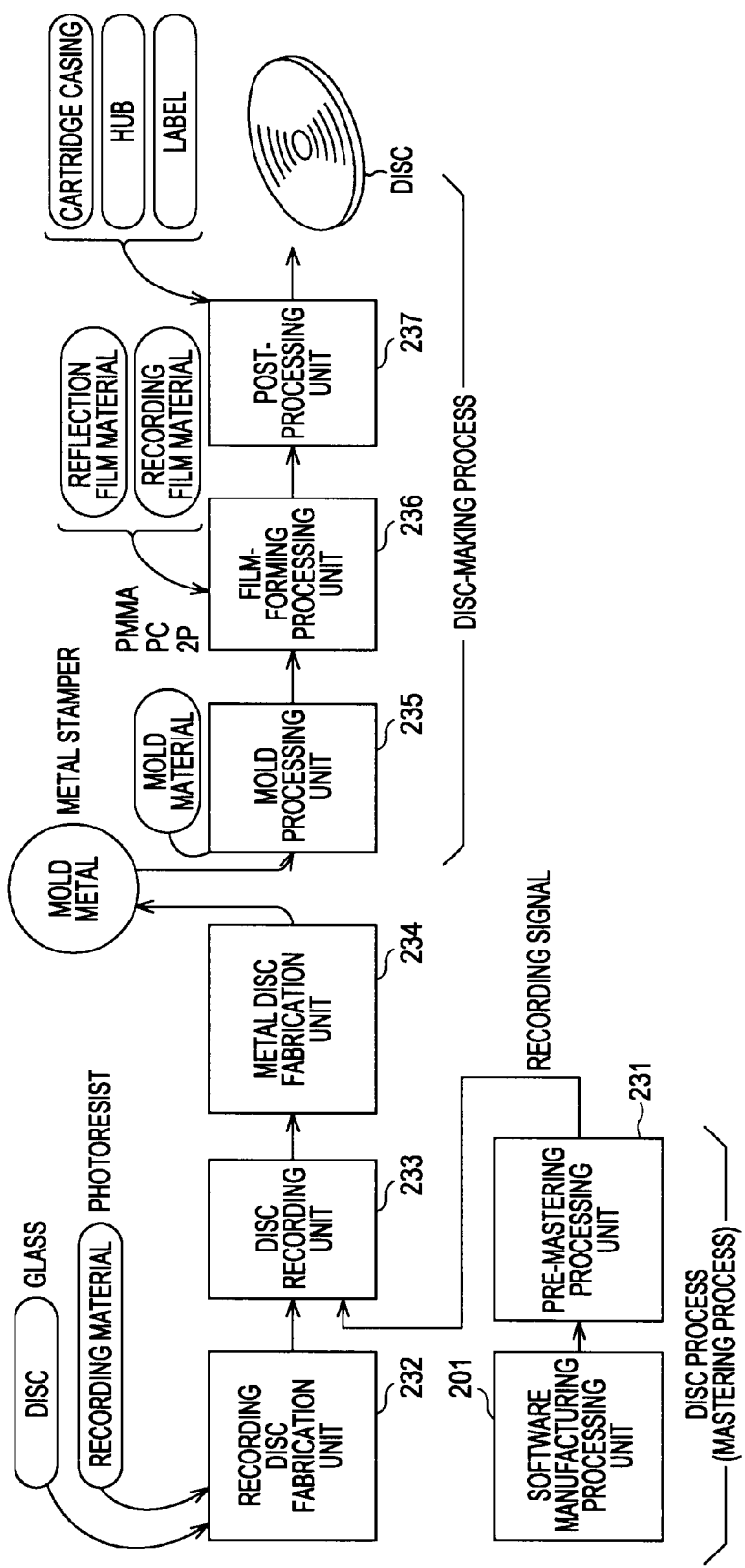
FIG. 26 illustrates an example of a configuration including a software manufacturing processing unit.

FIG. 26 illustrates a configuration example including the software manufacturing processing unit 201.

A part of the configuration shown in FIG. 26 may be provided within the recording device.

A mastering process is performed by the pre-mastering processing unit 231 for the recording signal generated by the software manufacturing processing unit 201 to generate a signal having a format to be recorded in the optical disc 2. The generated signal is supplied to the disc recording unit 233.

In the recording disc fabrication unit 232, a disc made of glass or the like is prepared, and a recording material made of a photoresist or the like is coated thereon. As a result, a recording disc can be manufactured.

In the disc recording unit 233, a laser beam is modulated according to the recording signal supplied from the pre-mastering processing unit 231 and then illuminated onto the photoresist. As a result, the photoresist on the disc is exposed according to the recording signal. Then, pits on the disc are formed by developing this disc.

In the metal disc fabrication unit 234, a process such as an electrocasting is performed to manufacture a metal disc to which the pits on the glass disc are transferred. Furthermore, a metal stamper is formed on the metal disc, which is used as a molding die.

In the mold processing unit 235, a material such as PMMA (acryl) or PC (polycarbonate) is injected to the molding die through injection and then stabilized. Otherwise, a material such as 2P (ultraviolet cured resin) is coated on the metal stamper and then cured by illuminating an ultraviolet ray. As a result, pits of the metal stamper can be transferred to the replica made of resin.

In the film-forming processing unit 236, a reflection film is formed on the replica through deposition or sputtering. Otherwise, the reflection film is formed on the replica through a spin-coat.

In the post-processing unit 237, inner and outer diameters are processed for this disc, and necessary processes such as attaching two discs are performed. The disc is inserted into a cartridge after forming a label or hub. As a result, it is possible to manufacture an optical disc 2 where the data that can be reproduced by the reproducer 1 are recorded.

A series of the processes described above may be executed by hardware or software. When a series of the processes are executed by software, a program functioning as the software is installed from a program recording medium in a computer or a general-purpose personal computer or the like integrated into dedicated hardware.

Figure 27:
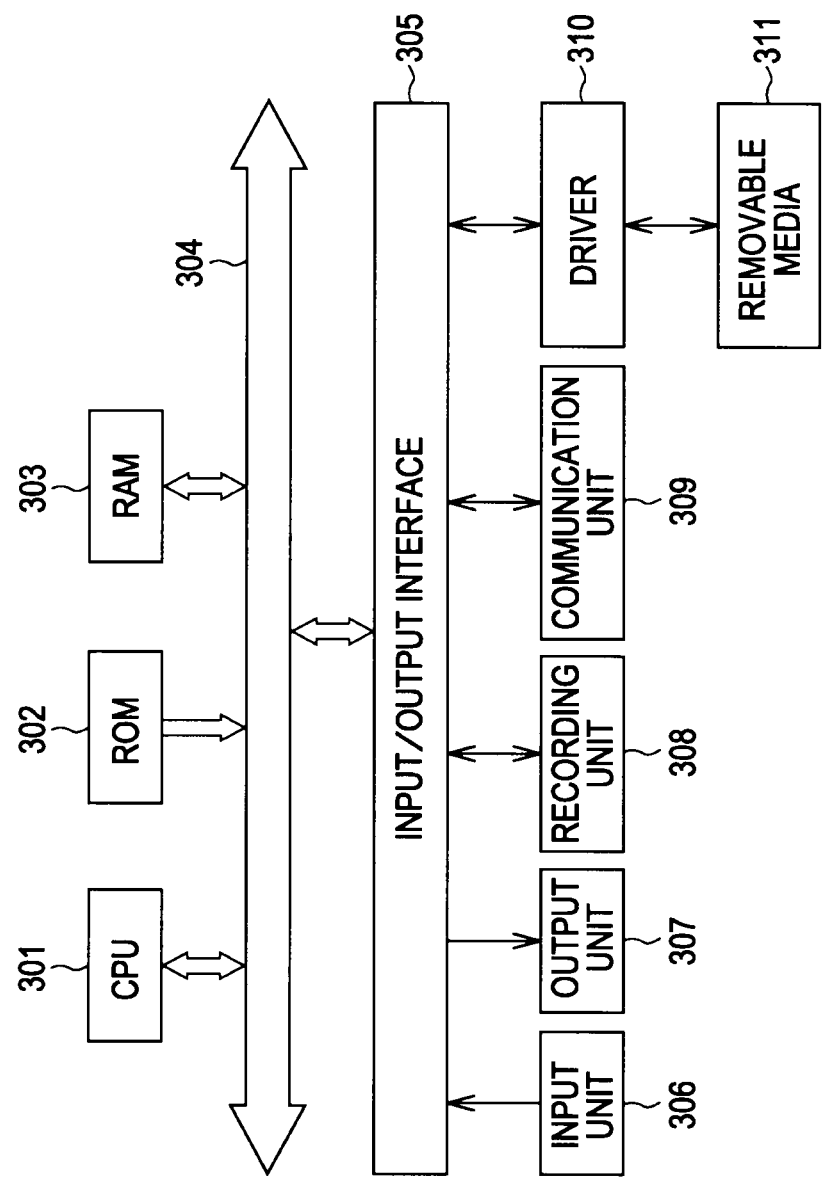
FIG. 27 is a block diagram illustrating a configuration example of computer hardware.

FIG. 27 is a block diagram illustrating a configuration example of computer hardware executing a series of the aforementioned processes by the program.

The CPU (Central Processing Unit) 301, the ROM (Read Only Memory) 302, and the RAM (Random Access Memory) 303 are connected to each other via a bus 304.

Furthermore, the input/output interface 305 is connected to the bus 304. An input unit 306 such as a keyboard or a mouse and an output unit 307 such as a display or a loudspeaker are connected to the input/output interface 305. Moreover, a storage unit 308 such as a hard disc or a non-volatile memory, a communication unit 309 such as a network interface, and a drive 310 for driving the remote medium 311 are connected to the bus 304.

In the computer constructed as described above, the CPU 301 performs a series of the aforementioned processes, for example, by loading the program stored in the storage unit 308 to the RAM 303 via the input/output interface 305 and the bus 304 and executing the program.

The program executed by the CPU 301 is installed in the storage unit 308 by recording it, for example, in a remote medium 311 or providing it via a wired or wireless transmission medium such as a local area network (LAN), the Internet, or a digital broadcasting.

In addition, the program executed by the computer may be processed in a time series according to the sequence described herein, or may be processed at a necessary timing in parallel or when it is called.

The present application contains subject matter related to that disclosed in Japanese Priority Patent Application JP 2009-093624 filed in the Japan Patent Office on Apr. 8, 2009, the entire content of which is hereby incorporated by reference.

The embodiments of the invention are not limited to the aforementioned examples but may be variously changed without departing from the scope and spirit of the present invention.

What is claimed is:

1. An information processing apparatus comprising:
a processor which sets type information, which represents that an application for executing a process using a dependent view video stream is an application for reproducing a 3-D image, in a clip information file which describes information on a transport stream including the dependent view video stream out of a base view video stream and the dependent view video stream obtained by encoding a plurality of video data according to a predetermined video coding format, wherein
the processor sets the type information when the base view video stream and the dependent view video stream are included in different transport streams for recording.

2. An information processing method comprising:
setting type information, which represents that an application for executing a process using a dependent view video stream is an application for reproducing a 3-D image, in a clip information file which describes information on a transport stream including the dependent view video stream out of a base view video stream and the dependent view video stream obtained by encoding a plurality of video data according to a predetermined video coding format, wherein
the setting includes setting the type information when the base view video stream and the dependent view video stream are included in different transport streams for recording.

3. A non-transitory computer-readable medium including a program executing, in a computer, a process comprising:
setting type information, which represents that an application for executing a process using a dependent view video stream is an application for reproducing a 3-D image, in a clip information file which describes information on a transport stream including the dependent view video stream out of a base view video stream and the dependent view video stream obtained by encoding a plurality of video data according to a predetermined video coding format, wherein the setting includes setting the type information when the base view video stream and the dependent view video stream are included in different transport streams for recording.

4. A non-transitory recording medium where type information, which represents that an application for executing a process using a dependent view video stream is an application for reproducing a 3-D image, is set in a clip information file which describes information on a transport stream including the dependent view video stream out of a base view video stream and a dependent view video stream obtained by encoding a plurality of video data according to a predetermined video coding format, wherein the type information is set when the base view video stream and the dependent view video stream are included in different transport streams for recording.

5. A reproducing apparatus comprising:

a processor that reproduces a base view video stream and a dependent view video stream by reading type information recorded in a recording medium where the type information, which represents that an application for executing a process using a dependent view video stream is an application for reproducing a 3-D image, is set in a clip information file which describes information on a transport stream including the dependent view video stream out of the base view video stream and the dependent view video stream obtained by encoding a plurality of video data according to a predetermined video coding format, wherein the type information is set when the base view video stream and the dependent view video stream are included in different transport streams for recording.

6. A reproducing method comprising:

reproducing a base view video stream and a dependent view video stream by reading type information recorded in a recording medium where the type information, which represents that an application for executing a process using a dependent view video stream, is set in a clip information file which describes information on a transport stream including the dependent view video stream out of the base view video stream and the dependent view video stream obtained by encoding a plurality of video data according to a predetermined video coding format is an application for reproducing a 3-D image, wherein the type information is set when the base view video stream and the dependent view video stream are included in different transport streams for recording.

7. A non-transitory computer-readable medium including a program executing, in a computer, a process comprising:

reproducing a base view video stream and a dependent view video stream by reading type information recorded in a recording medium where the type information, which represents that an application for executing a process using a dependent view video stream, is set in a clip information file which describes information on a transport stream including the dependent view video stream out of the base view video stream and the dependent view video stream obtained by encoding a plurality of video data according to a predetermined video coding format is an application for reproducing a 3-D image, wherein the type information is set when the base view video stream and the dependent view video stream are included in different transport streams for recording.

8. An information processing apparatus comprising:

a processor that sets a different value as a value of type information which represents a type of a path which uses a dependent view video stream as a reproducing interval, included in reproduction management information used to manage reproduction of a base view video stream and the dependent view video stream obtained by encoding a plurality of video data according to a predetermined video coding format based on whether the dependent view video stream is multiplexed in the same transport stream as that of the base view video stream and a recording location of the dependent view video stream, wherein the type information is set when the base view video stream and the dependent view video stream are included in different transport streams for recording.

9. An information processing method comprising:

setting a different value as a value of type information which represents a type of a path which uses a dependent view video stream as a reproducing interval, included in reproduction management information used to manage reproduction of a base view video stream and the dependent view video stream obtained by encoding a plurality of video data according to a predetermined video coding format based on whether the dependent view video stream is multiplexed in the same transport stream as that of the base view video stream and a recording location of the dependent view video stream, wherein the type information is set when the base view video stream and the dependent view video stream are included in different transport streams for recording.

10. A non-transitory computer-readable medium including a program executing, in a computer, a process comprising:

setting a different value as a value of type information which represents a type of a path which uses a dependent view video stream as a reproducing interval, included in reproduction management information used to manage reproduction of a base view video stream and the dependent view video stream obtained by encoding a plurality of video data according to a predetermined video coding format based on whether the dependent view video stream is multiplexed in the same transport stream as that of the base view video stream and a recording location of the dependent view video stream, wherein the type information is set when the base view video stream and the dependent view video stream are included in different transport streams for recording.

11. A non-transitory recording medium where a different value is set as a value of type information which represents a type of a path which uses a dependent view video stream as a reproducing interval, included in reproduction management information used to manage reproduction of a base view video stream and the dependent view video stream obtained by encoding a plurality of video data according to a predetermined video coding format based on whether the dependent view video stream is multiplexed in the same transport stream as that of the base view video stream and a recording location of the dependent view video stream, wherein the type information is set when the base view video stream and the dependent view video stream are included in different transport streams for recording.

12. A reproducing apparatus comprising:

a processor that reproduces a base view video stream and a dependent view video stream by reading type information recorded in the recording medium where a different value is set as a value of type information which represents a type of a path which uses a dependent view video stream as a reproducing interval, included in reproduction management information used to manage reproduction of a base view video stream and the dependent view video stream obtained by encoding a plurality of video data according to a predetermined video coding format based on whether the dependent view video stream is multiplexed in the same transport stream as that of the base view video stream and a recording location of the dependent view video stream, wherein the type information is set when the base view video stream and the dependent view video stream are included in different transport streams for recording.

13. A reproducing method comprising:

reproducing a base view video stream and a dependent view video stream by reading type information recorded in a recording medium where a different value is set as a value of type information which represents a type of a path which uses a dependent view video stream as a reproducing interval, included in reproduction management information used to manage reproduction of a base view video stream and the dependent view video stream obtained by encoding a plurality of video data according to a predetermined video coding format based on whether the dependent view video stream is multiplexed in the same transport stream as that of the base view video stream and a recording location of the dependent view video stream, wherein the type information is set when the base view video stream and the dependent view video stream are included in different transport streams for recording.

14. A non-transitory computer-readable medium including a program executing, in a computer, a process comprising:

reproducing a base view video stream and a dependent view video stream by reading type information recorded in a recording medium where a different value is set as a value of type information which represents a type of a path which uses a dependent view video stream as a reproducing interval, included in reproduction management information used to manage reproduction of a base view video stream and the dependent view video stream obtained by encoding a plurality of video data according to a predetermined video coding format based on whether the dependent view video stream is multiplexed in the same transport stream as that of the base view video stream and a recording location of the dependent view video stream, wherein the type information is set when the base view video stream and the dependent view video stream are included in different transport streams for recording.

* * * * *